US007882067B2

(12) United States Patent
Saika

(10) Patent No.: US 7,882,067 B2
(45) Date of Patent: Feb. 1, 2011

(54) SNAPSHOT MANAGEMENT DEVICE AND SNAPSHOT MANAGEMENT METHOD

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 330 days.

(21) Appl. No.: 11/407,893

(22) Filed: Apr. 21, 2006

(65) Prior Publication Data
US 2007/0198605 A1 Aug. 23, 2007

(30) Foreign Application Priority Data
Feb. 14, 2006 (JP) ............................. 2006-036365

(51) Int. Cl.
G06F 7/00 (2006.01)
(52) U.S. Cl. ...................... 707/639; 707/649
(58) Field of Classification Search .................. 707/639
See application file for complete search history.

(56) References Cited

U.S. PATENT DOCUMENTS

| 5,870,758 | A * | 2/1999 | Bamford et al. ................. 1/1 |
| 6,594,744 | B1 * | 7/2003 | Humlicek et al. ............ 711/162 |
| 6,694,413 | B1 * | 2/2004 | Mimatsu et al. .............. 711/162 |
| 6,959,310 | B2 * | 10/2005 | Eshel et al. .................. 707/200 |
| 6,981,114 | B1 * | 12/2005 | Wu et al. ..................... 711/162 |
| 7,237,076 | B2 * | 6/2007 | Nakano et al. ............... 711/162 |
| 7,555,505 | B2 * | 6/2009 | Yamagami ......................... 1/1 |
| 2003/0182313 | A1 * | 9/2003 | Federwisch et al. ......... 707/200 |
| 2003/0195903 | A1 * | 10/2003 | Manley et al. ............... 707/201 |
| 2004/0010487 | A1 * | 1/2004 | Prahlad et al. .................. 707/1 |
| 2004/0103104 | A1 * | 5/2004 | Hara et al. .................... 707/100 |
| 2004/0117572 | A1 * | 6/2004 | Welsh et al. ................. 711/162 |
| 2004/0250033 | A1 * | 12/2004 | Prahlad et al. ............... 711/162 |
| 2005/0033929 | A1 * | 2/2005 | Burton et al. ................ 711/162 |
| 2006/0075200 | A1 * | 4/2006 | Satoyama et al. ............ 711/162 |
| 2006/0218135 | A1 * | 9/2006 | Bisson et al. ..................... 707/4 |
| 2007/0073783 | A1 * | 3/2007 | Honami et al. ............... 707/200 |

FOREIGN PATENT DOCUMENTS

JP 2004-342050 2/2004

* cited by examiner

Primary Examiner—Charles Rones
Assistant Examiner—Mellissa M Chojnacki
(74) Attorney, Agent, or Firm—Antonelli, Terry, Stout & Kraus, LLP.

(57) ABSTRACT

A snapshot management device and snapshot management method whereby a snapshot is obtained on a regular basis, the amount of difference between two obtained snapshots is detected and, when the detected difference amount is smaller than a threshold value, of the two snapshots, the snapshot obtained earlier than the other is deleted, thereby contributing to the improved convenience.

10 Claims, 24 Drawing Sheets

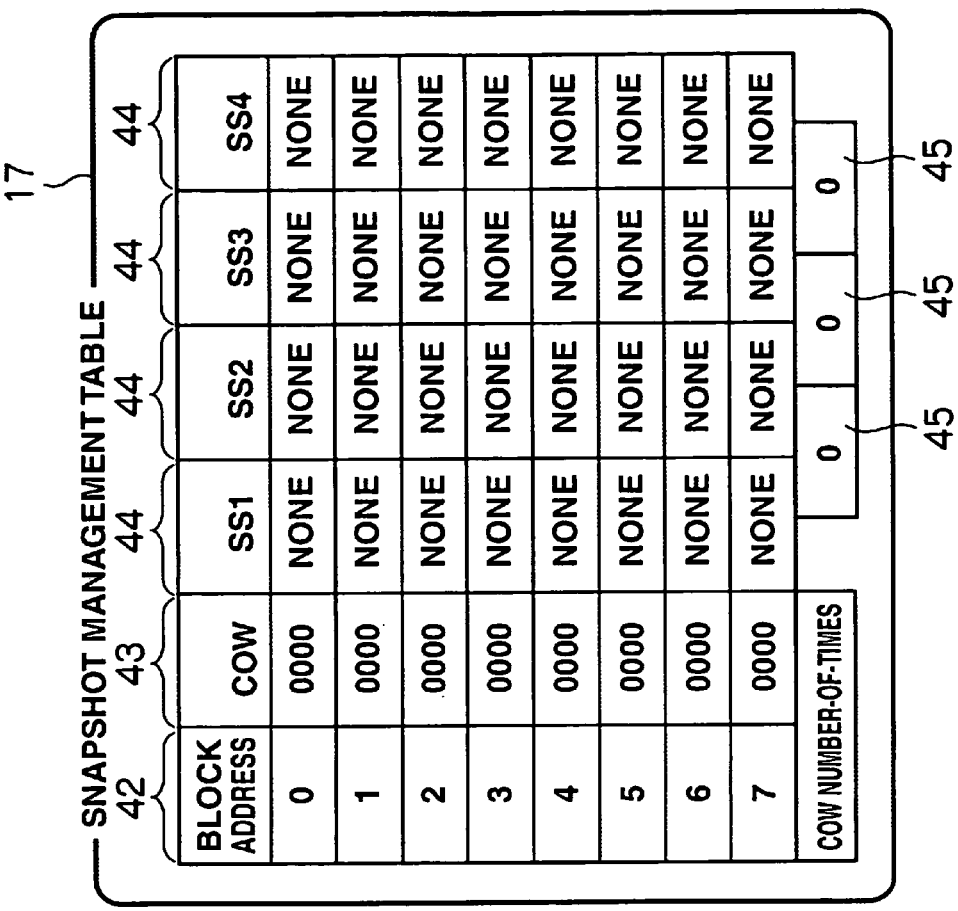
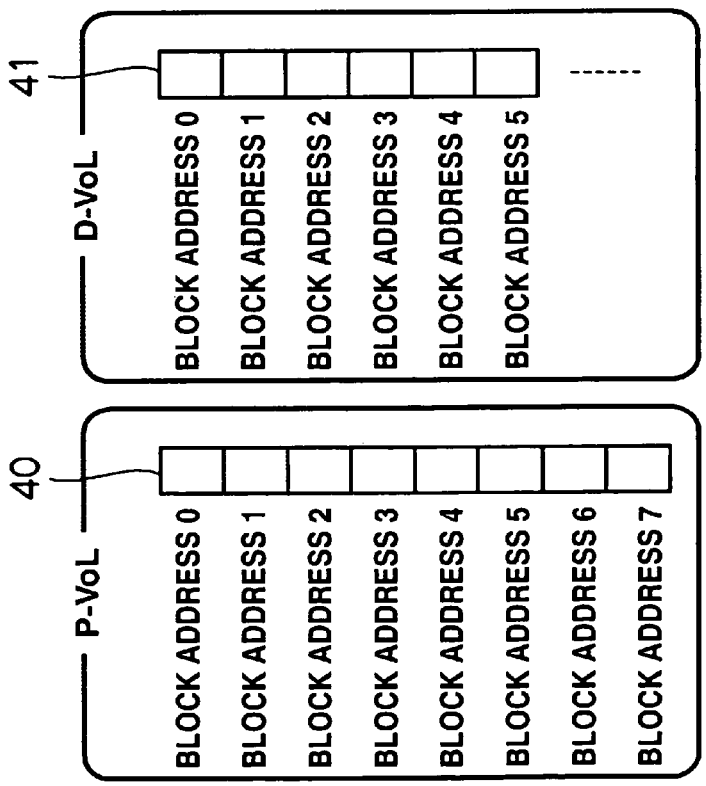

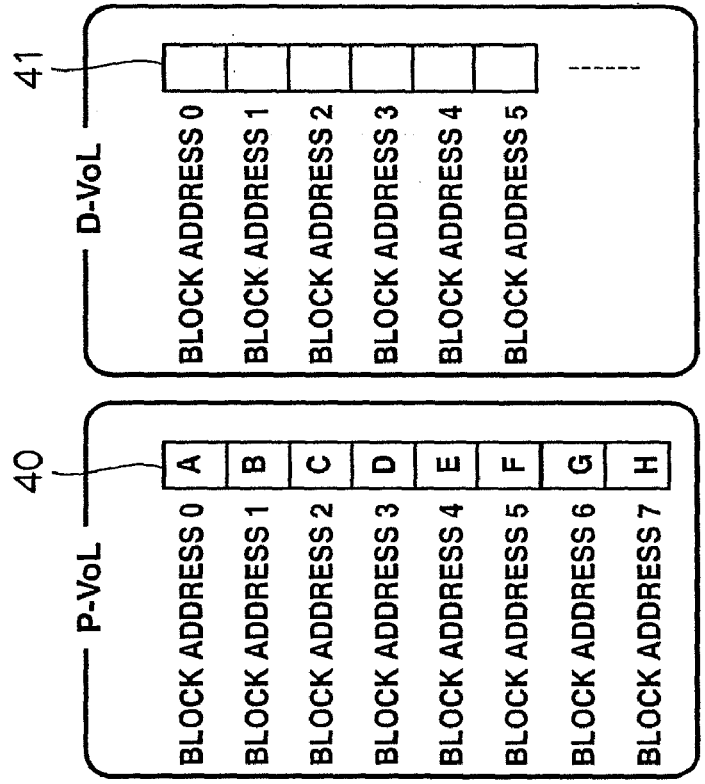

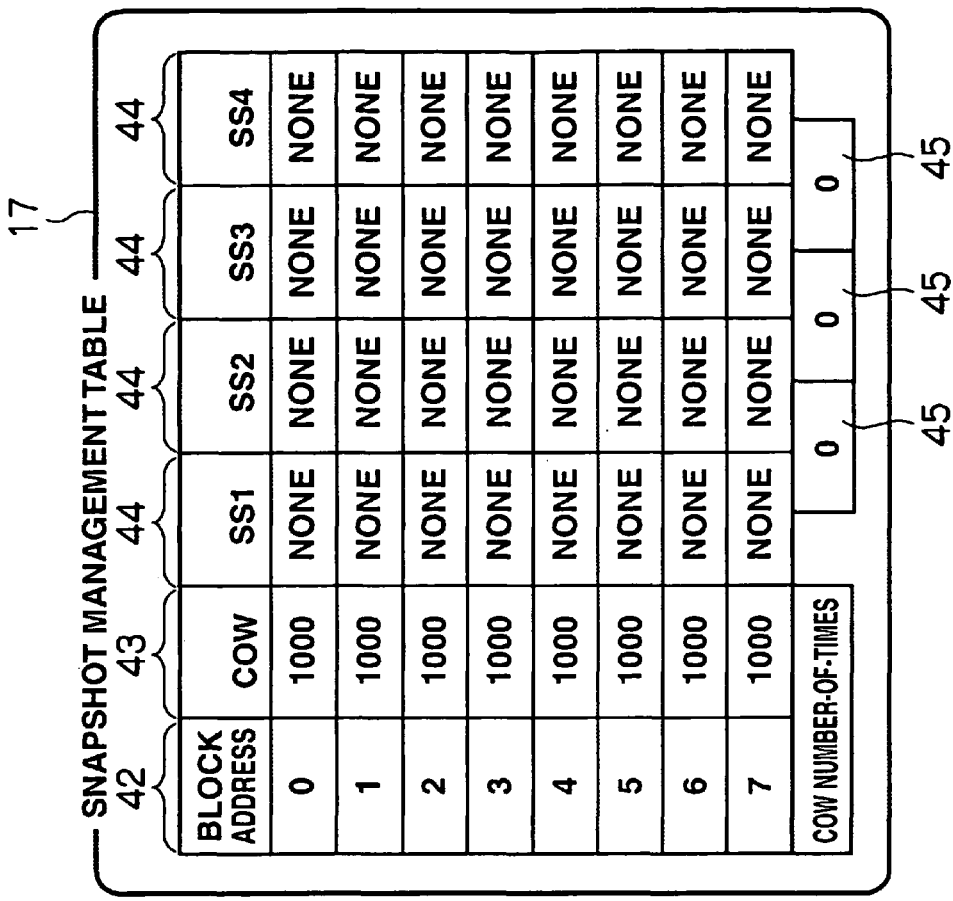
FIG.7C
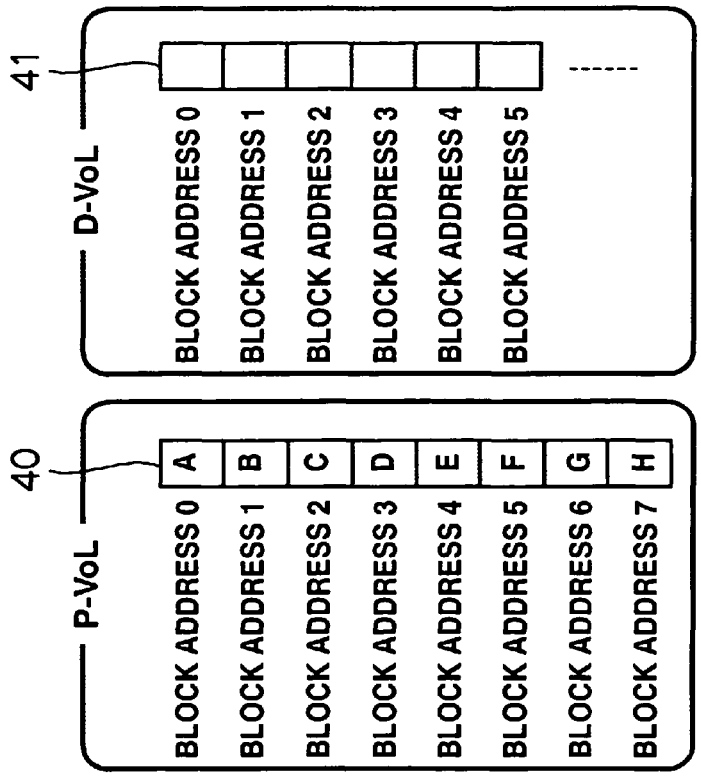
FIG.7B
FIG.7A

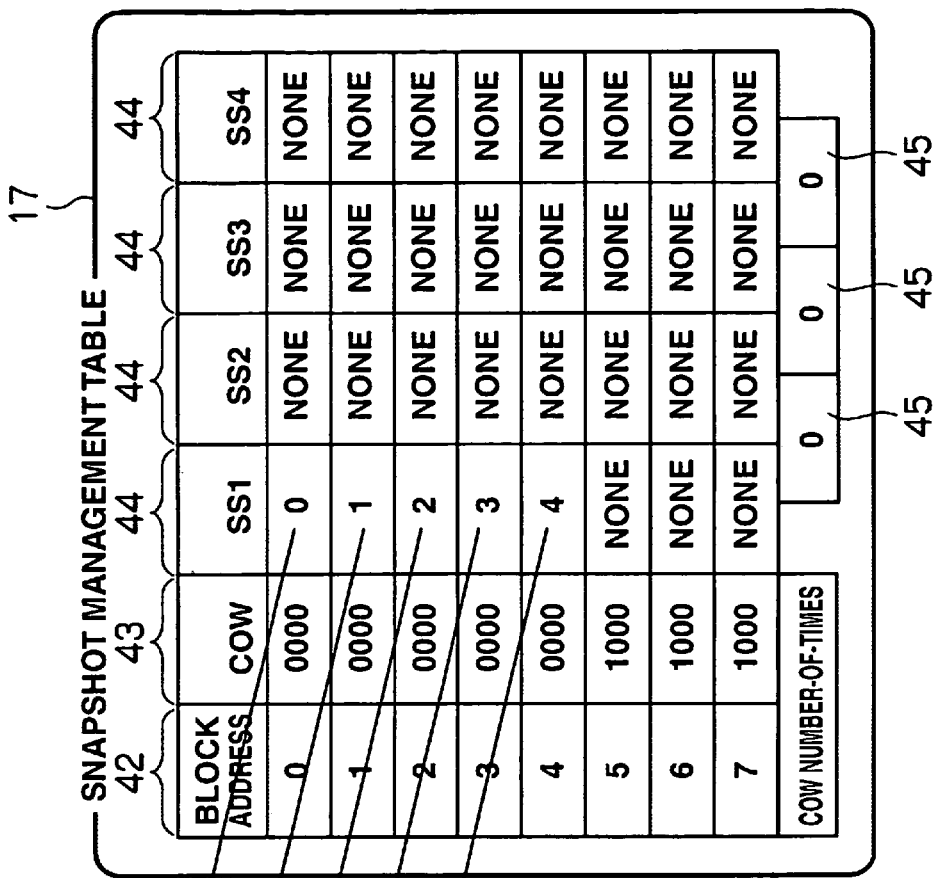
FIG.8C
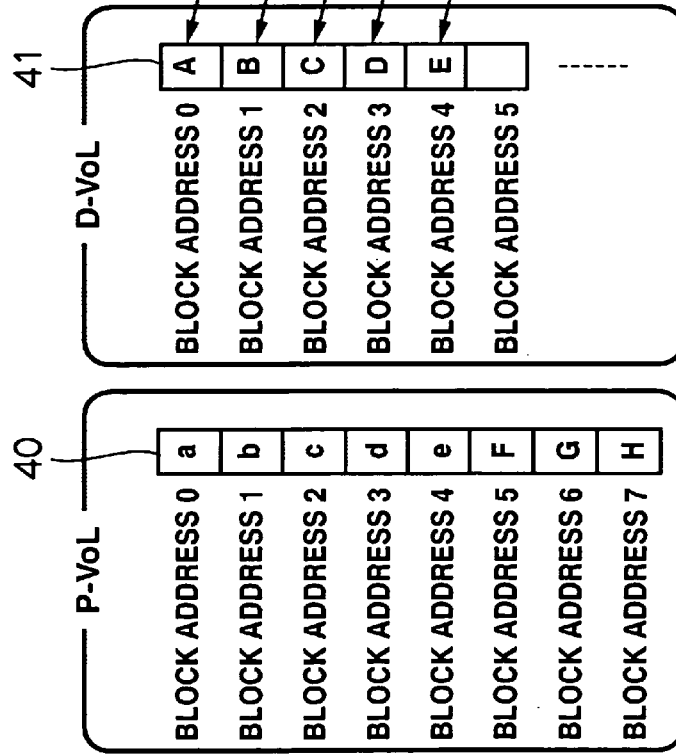
FIG.8B
FIG.8A

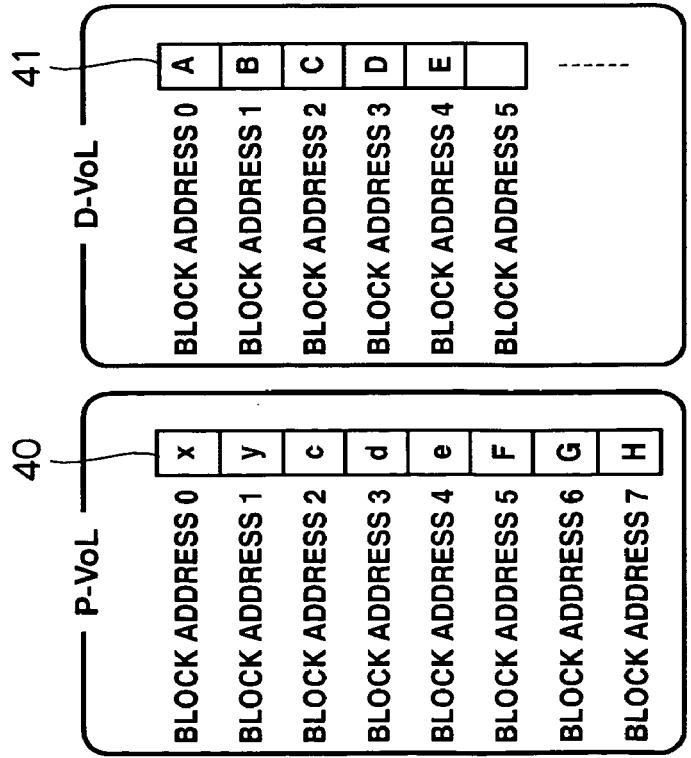

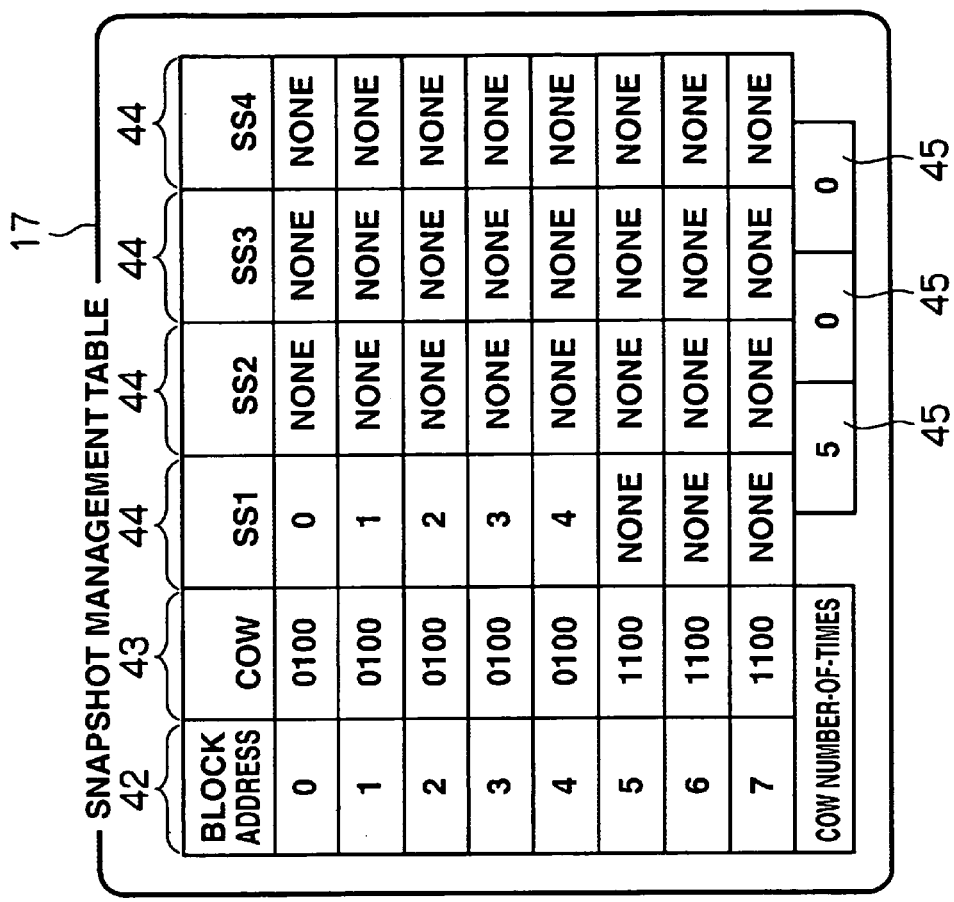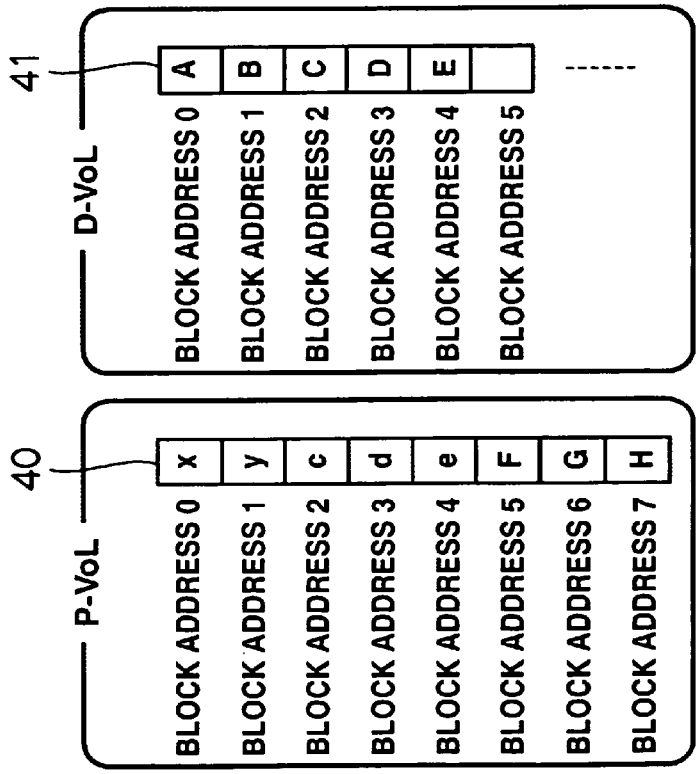

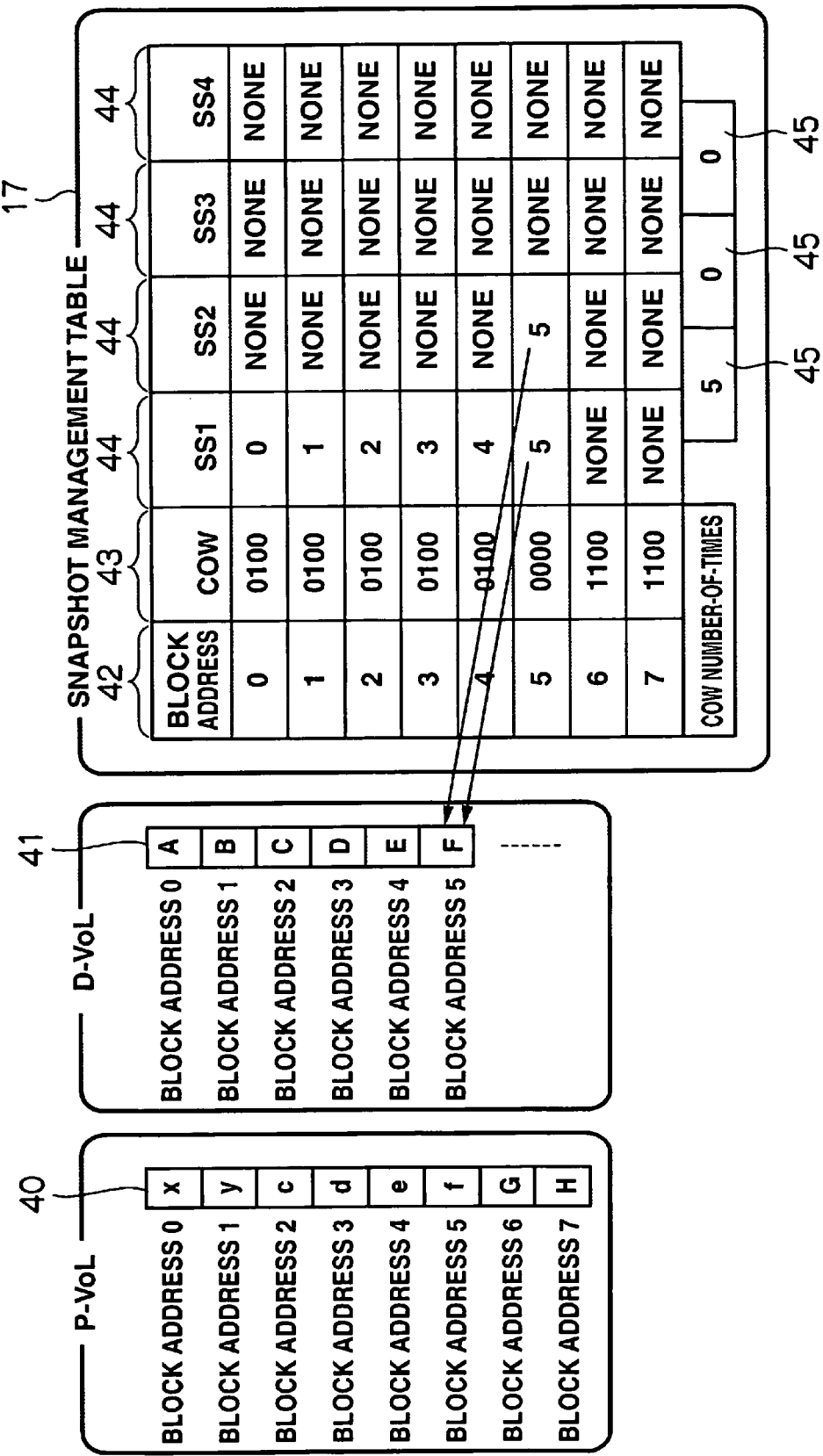

FIG.12A

P-Vol 40: x, y, c, d, e, f, G, H (BLOCK ADDRESS 0–7)

FIG.12B

D-Vol 41: A, B, C, D, E, F, ...... (BLOCK ADDRESS 0–5)

FIG.12C

SNAPSHOT MANAGEMENT TABLE 17

| BLOCK ADDRESS 42 | COW 43 | SS1 44 | SS2 44 | SS3 44 | SS4 44 |
|---|---|---|---|---|---|
| 0 | 0110 | 0 | NONE | NONE | NONE |
| 1 | 0110 | 1 | NONE | NONE | NONE |
| 2 | 0110 | 2 | NONE | NONE | NONE |
| 3 | 0110 | 3 | NONE | NONE | NONE |
| 4 | 0110 | 4 | 5 | NONE | NONE |
| 5 | 0010 | 5 | NONE | NONE | NONE |
| 6 | 1110 | NONE | NONE | NONE | NONE |
| 7 | 1110 | NONE | NONE | NONE | NONE |
| COW NUMBER-OF-TIMES | | 5 | 5 | 1 | 0 |

45

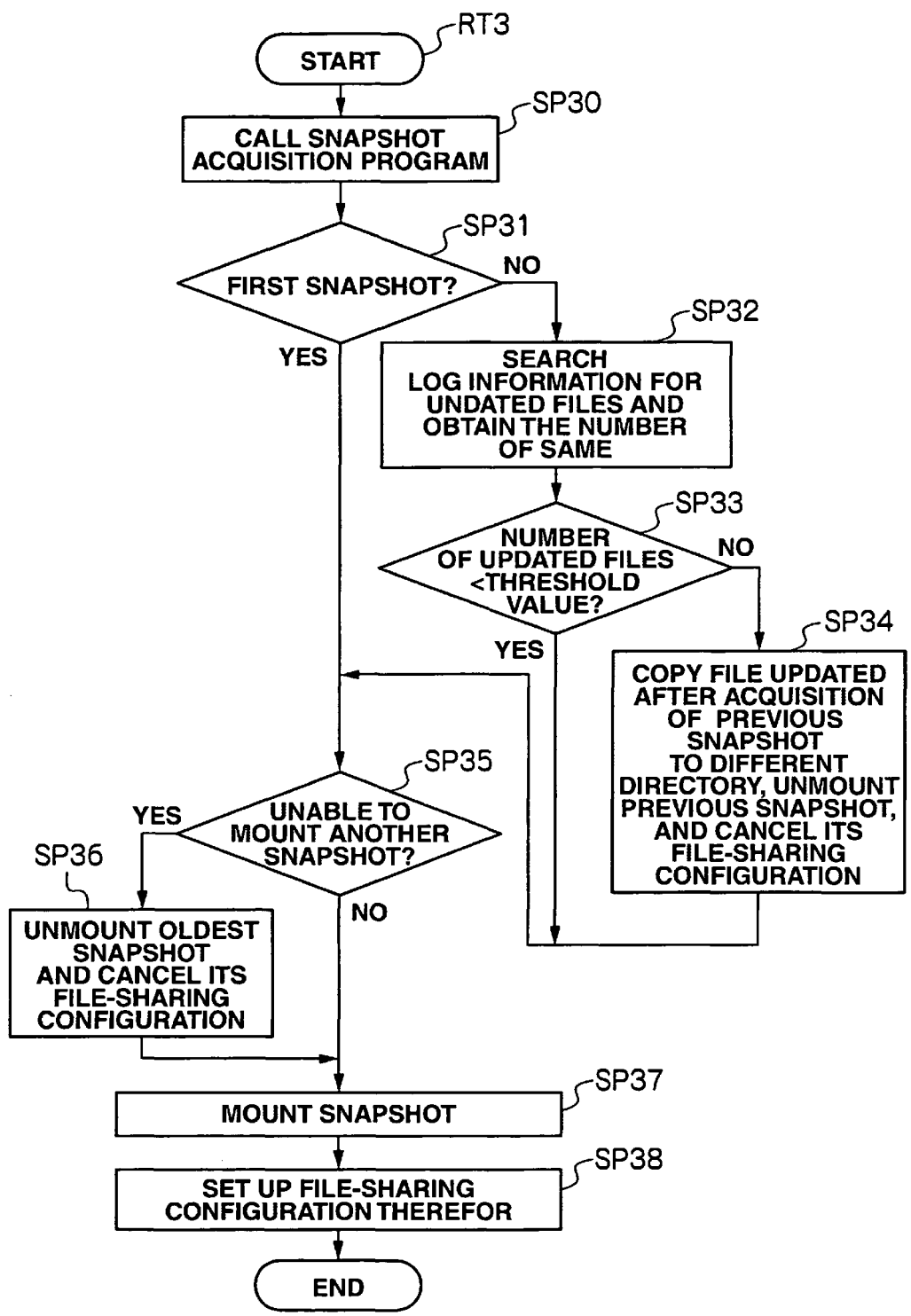

SNAPSHOT MANAGEMENT DEVICE AND SNAPSHOT MANAGEMENT METHOD

CROSS REFERENCES TO RELATED APPLICATIONS

This application relates to and claims priority from Japanese Patent Application No. 2006-036365, filed on Feb. 14, 2006 the entire disclosure of which is incorporated herein by reference.

BACKGROUND OF THE INVENTION

The present invention relates to a snapshot management device and snapshot management method suitable for use in a storage system.

Snapshot is one of the conventional techniques used in network storage such as a Network Attached Storage (NAS). It is a technique to maintain a static image of a file system at a certain point in time while maintaining the latest status of the file system by updating the file therein.

Snapshots are used for online backup which enables backup using snapshots even when updating file systems, and for file recovery when a file is mistakenly updated or deleted by a user.

In recent years, a proposal has been made to obtain a plurality of generations of snapshots, for example, in Japanese Patent Laid-Open Publication No. 2004-342050. Using the technique disclosed in this document, it is possible to sequentially mount a plurality of snapshots obtained on a regular basis and to set up a file-sharing configuration for the snapshots in the NAS so as to make them public to multiple users.

SUMMARY OF THE INVENTION

With conventional NAS, the number of volumes (number of snapshots) that can be mounted is limited even though the number differs depending on the specifications of the operating system (OS) used in the NAS, and it is impossible to mount all obtained snapshots.

Therefore, when conventional NAS has a function for automatically obtaining a snapshot on a regular basis and setting up a file-sharing configuration for the obtained snapshots to make them public to users, each time a new snapshot is mounted, the oldest snapshot has to be unmounted.

However, if a file system is not updated frequently, snapshots obtained by NAS with the above function have roughly the same content (e.g., the most recently obtained snapshot has 99% the same content as the snapshot created before it) and, each time such a snapshot is added, the oldest snapshot, that has the biggest difference from the most recent volume has to be unmounted.

When a user realizes his/her own update mistake in the past and checks the mistake, it is better for him/her to refer to a group of snapshots that cover a long period of time.

This invention was devised in light of the foregoing points and proposes a snapshot management device and snapshot management method being able to contribute to the improved convenience.

This invention proposing the above is a snapshot management device that obtains and manages a snapshot, which is an image of a first volume at a certain point in time, the first volume being used by a user. The snapshot management device includes: a snapshot obtaining unit that obtains a snapshot on a regular basis and manages the obtained snapshot; a difference amount detecting unit that detects the amount of difference between two snapshots obtained by the snapshot obtaining unit; and a snapshot deleting unit that deletes, from among the two snapshots, the snapshot obtained earlier than the other, when the difference amount detected by the difference amount detecting unit is smaller than a predetermined threshold value. Here, the meaning of 'delete the snapshot' includes where, as a result of unmounting a snapshot or cancelling its file-sharing configuration, a user cannot refer to the snapshot, which is actually the same as where the snapshot is deleted from the user's view (hereinafter the same).

Consequently, with the snapshot management device according to the invention, accumulation of a plurality of snapshots having approximately the same content is prevented and snapshots covering a long period of time and having different content can be provided to the user.

Moreover, this invention is a snapshot managing method for obtaining and managing a snapshot, which is an image of a first volume at a certain point in time, the first volume being used by a user. This method includes: a first step of obtaining a snapshot on a regular basis and managing the obtained snapshot; a second step of detecting the amount of difference between two obtained snapshots; and a third step of deleting, from among the two snapshots, the snapshot obtained earlier than the other, when the detected difference amount is smaller than a predetermined threshold value.

Consequently, with the above snapshot management method, accumulation of a plurality of snapshots having approximately the same content is prevented and snapshots covering a long period of time and having different content can be provided to the user.

This invention enables a user to refer to snapshots covering a long period of time and having different content, thereby contributing to the improved convenience.

BRIEF DESCRIPTION OF THE DRAWINGS

FIG. 5A is a conceptual diagram explaining a snapshot management table.

FIG. 5B is a conceptual diagram explaining a snapshot management table.

FIG. 5C is a conceptual diagram explaining a snapshot management table.

FIG. 6A is a conceptual diagram explaining snapshot acquisition processing.

FIG. 6B is a conceptual diagram explaining snapshot acquisition processing.

FIG. 6C is a conceptual diagram explaining snapshot acquisition processing.

FIG. 7A is a conceptual diagram explaining snapshot acquisition processing.

FIG. 7B is a conceptual diagram explaining snapshot acquisition processing.

FIG. 7C is a conceptual diagram explaining snapshot acquisition processing.

FIG. 8A is a conceptual diagram explaining snapshot acquisition processing.

FIG. 8B is a conceptual diagram explaining snapshot acquisition processing.

FIG. 8C is a conceptual diagram explaining snapshot acquisition processing.

FIG. 9A is a conceptual diagram explaining snapshot acquisition processing.

FIG. 9B is a conceptual diagram explaining snapshot acquisition processing.

FIG. 9C is a conceptual diagram explaining snapshot acquisition processing.

FIG. 10A is a conceptual diagram explaining snapshot acquisition processing.

FIG. 10B is a conceptual diagram explaining snapshot acquisition processing.

FIG. 10C is a conceptual diagram explaining snapshot acquisition processing.

FIG. 11A is a conceptual diagram explaining snapshot acquisition processing.

FIG. 11B is a conceptual diagram explaining snapshot acquisition processing.

FIG. 11C is a conceptual diagram explaining snapshot acquisition processing.

FIG. 12A is a conceptual diagram explaining snapshot acquisition processing.

FIG. 12B is a conceptual diagram explaining snapshot acquisition processing.

FIG. 12C is a conceptual diagram explaining snapshot acquisition processing.

FIG. 18 is a flowchart showing a second mounting/file-sharing configuration setting processing routine.

DETAILED DESCRIPTION OF THE INVENTION

Embodiments of this invention are described below in detail with reference to the attached drawings.

1. Embodiment 1

1-1. Configuration of Storage System according to Embodiment 1

Figure 1:
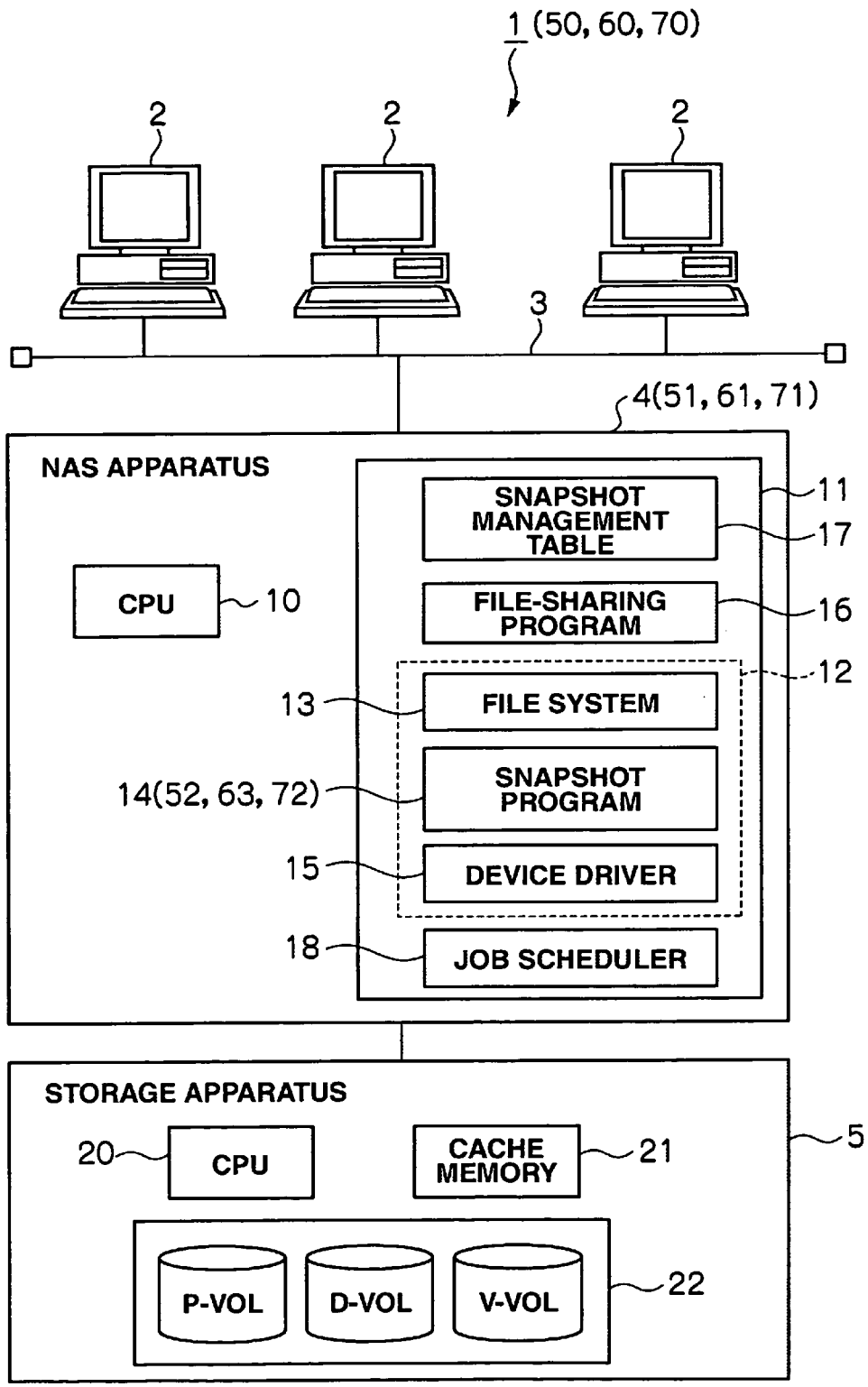
FIG. 1 is a block diagram showing the schematic configuration of a storage system.

In FIG. 1, reference numeral 1 indicates an entire storage system according to Embodiment 1. This storage system 1 has a configuration where one or more host systems 2 are connected to a NAS apparatus 4 via a network 3, the NAS apparatus 4 further being connected to a storage apparatus 5.

The host system 2, which is a computer having information processing resources such as a central processing unit (CPU) and memory, is a personal computer, work station, or a mainframe, etc. It includes information input devices (not shown in the diagram) such as a keyboard, switches, pointing device, and microphone as well as information output devices (not shown in the diagram) such as a monitor display and speaker.

The network 3 is a local area network (LAN), the Internet, public line or private line. Communication between the host system 2 and the NAS apparatus 4 via the network 3 is based on the Transmission Control Protocol/Internet Protocol (TCP/IP) protocol.

The NAS apparatus 4 includes a CPU 10 and memory 11, etc. The CPU 10 is a processor that executes data input/output processing in response to data input/output requests from the host system 2. It executes various processing relating to a file system function, file-sharing function and snapshot function based on various control programs stored in the memory 11, as will be described later.

The memory 11 stores a file system 13 constituting an operating system (OS) layer 12, snapshot program 14, device driver 15, file-sharing program 16, snapshot management table 17, and job scheduler 18.

The file system 13 is a program for providing logical views such as hierarchical directories and files to the upper layer and converting these logical views to physical data structures such as block data and block addresses, thereby executing data I/O processing with the lower layers. The snapshot program 14 is a program for executing the function (snapshot function) of maintaining a plurality of snapshots, a snapshot being a static file system image at a certain point in time. The device driver 15 is a program for executing block I/O requested by the file system 13.

The file-sharing program 16 is a program for providing file-sharing protocols, such as Network File System (NFS) protocol and Common Internet File System (CIFS) protocol, to the host system 2 connected to the file-sharing program 16 via the network 3 and providing a file-sharing service that enables the sharing of one file between a plurality of host systems 2. By running this file-sharing program 16, the CPU 10 executes data input/output processing in response to requests from the host system 2 to input and output data in units of files.

The snapshot management table 17 is used to consolidate the management of a plurality of snapshots. The job scheduler 18 is a program for issuing orders for the snapshot program 14 and other programs to execute predetermined processing at predetermined timing.

The storage apparatus 5 includes a CPU 20, cache memory 21, and disk drive group 22 consisting of a plurality of disk drives. The CPU 20 is a processor responsible for controlling the overall operation of the storage apparatus 5.

The cache memory 21 is used as work memory for the CPU 20. It stores various control programs and control parameters. By the CPU 20 executing these control programs and controlling the relevant disk drives and cache memory, the entire storage apparatus 5 can execute data input/output processing in response to data input/output requests provided from the host system 2 via the NAS apparatus 4.

Each of the disk drives constituting the disk drive group 22 is an expensive disk such as a Small Computer System Interface (SCSI) disk or an inexpensive disk such as a Serial AT Attachment (SATA) disk or optical disk. These disk drives are used in RAID format by the CPU 20.

One or a plurality of logical volumes is set on the physical storage area provided by a RAID group configured from one or a plurality of disk drives and, in these logical volumes, data from the host system 2 is written in units of blocks of a predetermined size.

Each logical volume is assigned a unique identifier (logical unit number; LUN). In Embodiment 1, the input and output of data is performed by designating an address, which is a combination of the above identifier and a unique number assigned to each block (logical block address; LBA).

Examples of the types of logical volumes created in the storage apparatus 5 include primary volumes P-VOL, differential volumes D-VOL, and virtual volumes V-VOL.

The primary volume P-VOL is a volume a user reads or writes data from or in and is accessed by using the file-sharing function provided by the device driver 15, file system 13, and file-sharing program 16 in the NAS apparatus 4. The differential volume D-VOL is a volume where, when the primary volume P-VOL is updated after a snapshot creation time, old data to be overwritten is saved. The user cannot recognize this differential volume D-VOL.

The virtual volume V-VOL is a virtual non-existent logical volume. One or a plurality of existent logical volumes (hereinafter called 'real volumes') is associated with this virtual volume V-VOL. When the host system 2 makes a request to input or output data to/from the virtual volume V-VOL, data is read from or written in the real volume associated with the virtual volume V-VOL.

The snapshot function is for providing an image of a primary volume at a snapshot creation time to the file system 13, by creating a virtual volume V-VOL which is a synthesis of the primary volume P-VOL and the corresponding differential volume D-VOL.

Figure 2A:
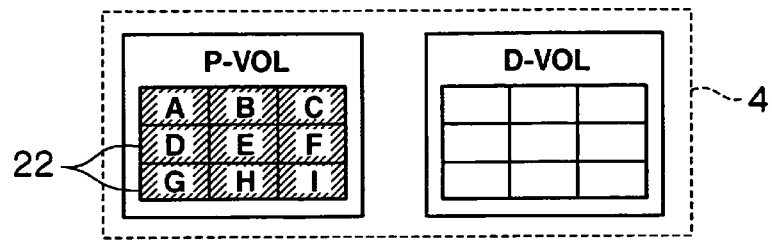
FIG. 2A is a conceptual diagram explaining a snapshot technique.

For example, as shown in FIG. 2A, it is assumed that, in an initial state, where the first to ninth blocks 22 in a primary volume P-VOL store data 'A' to 'I' respectively and a differential volume D-VOL has no data saved therein, a snapshot of the primary volume P-VOL is created.

Figure 2B:
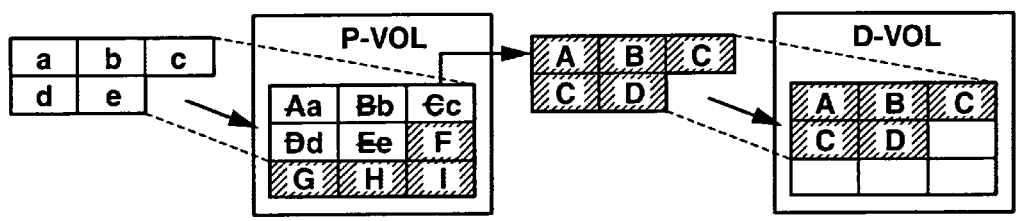
FIG. 2B is a conceptual diagram explaining the snapshot technique.
Figure 2C:
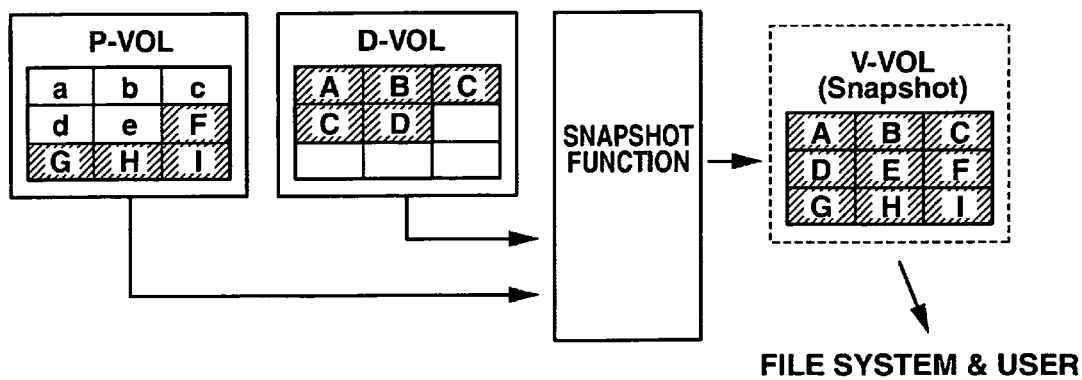
FIG. 2C is a conceptual diagram explaining the snapshot technique.

After that, when the storage apparatus 5 is given a data input/output request from the host system 2 to write data 'a' to 'e' in the first to fifth blocks 22 in the primary volume P-VOL, it saves the old data that has been stored in the first to fifth blocks 22 in the primary volume P-VOL in the differential volume D-VOL as differential data and then stores new data in the first to fifth blocks 22, as shown in FIG. 2B.

Then, if the storage apparatus 5 is given a request from the host system 2 to refer to the snapshot created at the point in time described in FIG. 2A, it executes the snapshot function to create a virtual volume V-VOL by combining the non-updated data stored in the sixth to ninth blocks 22 in the primary volume P-VOL and the old data saved in the differential volume D-VOL and provides it to the file system 13 and the user as the requested snapshot.

Accordingly, with the storage system 1, the user can access snapshots using the file system function and file-sharing function.

1-2. Explanation of Snapshot Function according to Embodiment 1

1-2-1. Outline of Snapshot Function according to Embodiment 1

The snapshot function provided in the storage system 1 will be explained below.

The storage system 1 according to Embodiment 1 is configured so that the NAS apparatus 4 obtains a snapshot on a regular basis, mounts it and sets up a configuration to share the snapshot (hereinafter called 'file-sharing configuration'), thereby enabling users to refer to the snapshot.

In the foregoing case, if the amount of updated data saved in the differential volume D-VOL during the time between the acquisition of a first snapshot and that of a second snapshot is small, the NAS apparatus 4 unmounts the first snapshot when the second snapshot is obtained and cancels the first snapshot's file-sharing configuration.

With the foregoing configuration of the NAS apparatus 4, however, for an infrequently-updated primary volume P-VOL, each time a snapshot is created, the previous snapshot is unmounted and its file-sharing configuration cancelled, therefore, there is a problem that in snapshots do not cover long-term data. So in the storage system 1 according to Embodiment 1, the NAS apparatus 4 is configured so that a predetermined number of snapshots continue to be mounted and their file-sharing configurations are also maintained, even after the next snapshot is obtained, regardless of the amount of updated data saved in the differential volume D-VOL.

Figure 3A:
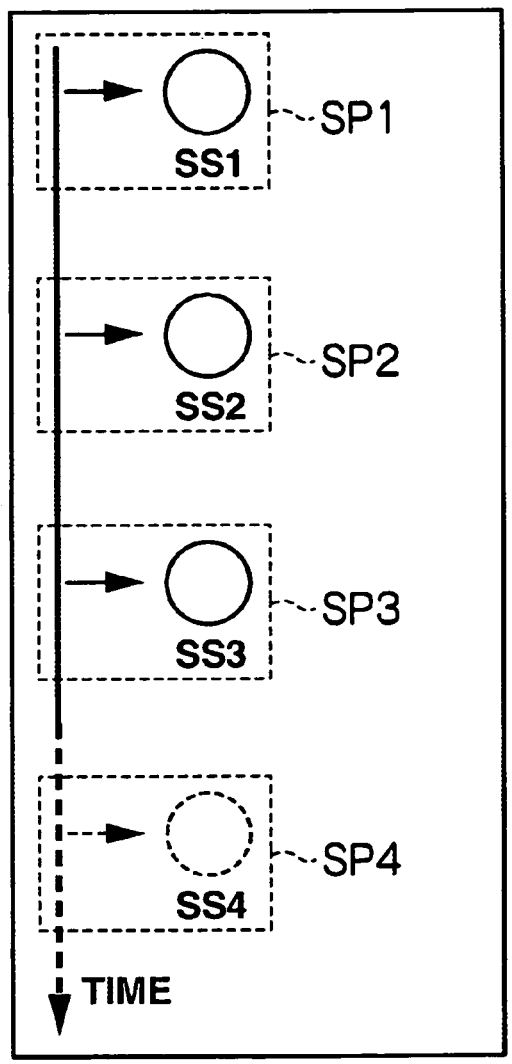
FIG. 3A is a conceptual diagram explaining the outline of a snapshot function according to Embodiments 1 to 4.
Figure 3B:
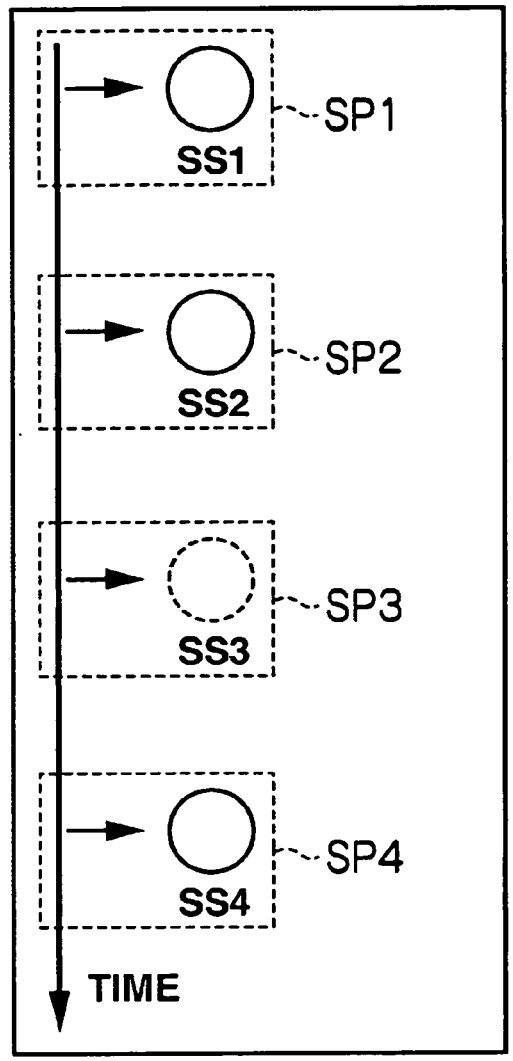
FIG. 3B is a conceptual diagram explaining the outline of a snapshot function according to Embodiments 1 to 4.

FIG. 3 shows the flow of the snapshot function of the NAS apparatus 4. The CPU 10 in the NAS apparatus 4 obtains a first snapshot (SS1) in the snapshot acquisition processing, which is performed on a regular basis. The CPU 10 then mounts the snapshot, and sets up a file-sharing configuration thereforfor it, thereby making the snapshot public to the users. As a result, the users can freely refer to the snapshot (SP1).

A predetermined period of time after the acquisition of the first snapshot, the CPU 10 obtains a second snapshot (SS2). The CPU 10 then calculates the amount of updated data saved in the differential volume D-VOL during the time between the acquisition of the first snapshot and that of the second snapshot. If the amount of updated data saved is smaller than a predetermined threshold value (hereinafter called 'updated-data-amount threshold value'), the CPU 10 unmounts the first snapshot and cancels its file-sharing configuration. Then, the CPU 10 mounts the second snapshot obtained above and sets up a file-sharing configuration for that snapshot, thereby making it public to the users (SP2).

Likewise, the CPU 10 further obtains a third snapshot (SS3) and fourth snapshot (SS4), each after a predetermined period of time and, each time, it calculates the amount of updated data saved in the differential volume D-VOL between the acquisition of the previous snapshot (second or third snapshot) and that of the current snapshot (third or fourth snapshot). If the amount of updated data saved is smaller than the updated-data-amount threshold value, the CPU 10 unmounts the previous snapshot and cancels its file-sharing configuration. Then, the CPU 10 mounts the obtained snapshot (third or fourth snapshot) and sets up a file-sharing configuration for that snapshot, thereby making it public to the users (SP3, SP4).

The CPU 10 then repeats the above steps SP2 to SP4.

Thus, with the storage system 1, from among the snapshots obtained at predetermined time intervals, snapshots having roughly the same content as the previously obtained snapshots are unmounted and the remaining snapshots are made public to the users while staying mounted with their file-sharing configurations maintained.

1-2-2. Functional Configuration of Storage Apparatus

Figure 4:
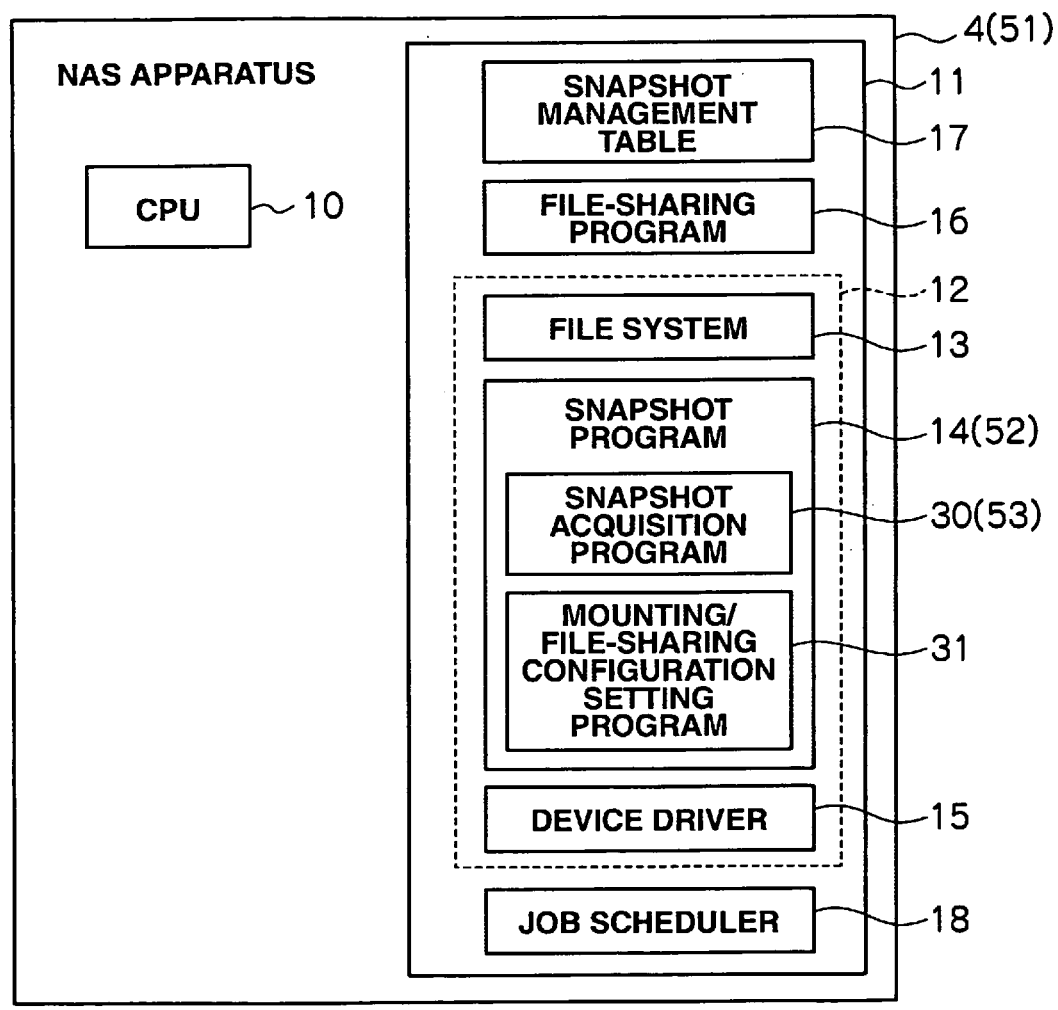
FIG. 4 is a block diagram showing the schematic configuration of a NAS apparatus according to Embodiments 1 and 2.

Next, the specific functional configuration of the NAS apparatus 4 for executing the foregoing snapshot function will be explained. In Embodiment 1, as shown in FIG. 4, the snapshot program 14 is configured from a snapshot acquisition program 30 and a first mounting/file-sharing configuration setting processing program 31. With these two programs, the CPU 30 obtains a snapshot based on the snapshot acquisition program 30 and executes mounting and file-sharing configuration setting processing for the obtained snapshot based on the first mounting/file-sharing configuration setting program 31.

1-2-2-1. Snapshot Acquisition Processing

FIG. 5C shows an example of the configuration of the snapshot management table 17, which is used by the CPU 10 in the NAS apparatus 4 to manage obtained snapshots. Here, for ease of explanation, the storage area of a primary volume P-VOL is configured from eight blocks 40 as shown in FIG. 5A and the storage area of a differential volume D-VOL is configured from an infinite number of blocks 41 as shown in FIG. 5B. The number of snapshots obtainable is set to a maximum of four.

As shown in FIG. 5C, the snapshot management table 17 has a block address field 42, copy-on-write bitmap field (hereinafter called 'CoW bitmap field') 43 and a plurality of save destination block address fields 44, for each block 40 in the primary volume P-VOL.

The block address fields 42 respectively store the block address ('0' to '7') of the blocks 40 in the primary volume P-VOL. The CoW bitmap fields 43 store respective bit strings (hereinafter called 'CoW bitmaps'), each CoW bitmap composed of the same number of bits as there are obtainable snapshots. From left to right, the bits in the CoW bitmap correspond to the first to fourth snapshots respectively and, in the initial state where no snapshot has been obtained, all the bits are set to '0.'

Four save destination block address fields 44 are provided to each block 40 in the primary volume P-VOL. These four save destination block address fields 44 are associated with the first to fourth snapshots (SS1 to SS4) respectively.

The respective save destination block address fields 44 store respective block addresses in the differential volume D-VOL, where pieces of differential data for snapshots (SS1 to SS4) of the relevant block 40 (i.e., the block 40 corresponding to the block address stored in the relevant block address field 42) in the primary volume P-VOL are stored respectively. If, however, no differential data has been saved in relation to a snapshot (SS1, SS2, SS3 or SS4) of the block 40 in the primary volume P-VOL, i.e., no user data has been written in the block 40 in relation to a snapshot, the code 'none,' indicating that there is no corresponding save destination block address is stored in the field 44.

The snapshot management table 17 also has CoW number-of-times fields 45, the fields corresponding to: the first and second snapshots; the second and third snapshots; and the third and fourth snapshots, respectively. The CoW number-of-times fields 45 store: the number of times one-block data is saved in the differential volume D-VOL (hereinafter called 'copy-on-write) during the time between the first snapshot creation and the second snapshot creation; the number of times copy-on-write is performed during the time between the second snapshot creation and the third snapshot creation; and the number of times copy-on-write is performed during the time between the third snapshot creation and the fourth snapshot creation, respectively. The number of copy-on-writes stored in the CoW number-of-times field 45 multiplied by the block size (a fixed length) is the amount of updated data saved in the differential volume D-VOL during the time between the acquisition of two successive snapshots.

In the state where, as shown in FIG. 6A, pieces of data 'A' to 'H' are stored in the blocks 40 with their block addresses being '0' to '7' in the primary volume P-VOL respectively and the snapshot management table 17 is in an initial state where no snapshot has been obtained as shown in FIG. 6C, when it is the time to obtain a first snapshot, the CPU 10 in the NAS apparatus 4 sets the leftmost bit in the CoW bitmap stored in the respective CoW bitmap fields 43 in the snapshot management table 17 to 'ON' ('1'), the leftmost bit corresponding to the first snapshot. When a bit in a CoW bitmap is 'ON,' as above, it means that, when user data is written in the relevant block 40 in the primary volume P-VOL, data in the block 40 immediately before that writing should be saved in the differential volume D-VOL as differential data. The CPU 10 then waits for a request to write user data in this primary volume P-VOL.

After that, for example, as shown in FIG. 8A, having received a data write request requesting that user data 'a,' 'b,' 'c,' 'd' and 'e' be written in the blocks 40 with the block addresses '0' to '4' in the primary volume P-VOL, the CPU 10 checks whether the relevant bits in the relevant CoW bitmaps in the snapshot management table 17 are set to 'ON,' based on the snapshot acquisition program 30. More specifically, the CPU 10 checks the values of the leftmost bits in each of the CoW bitmaps associated with the blocks 40 with the block addresses '0' to '4' in the snapshot management table 17, the leftmost bits corresponding to the first snapshot.

After checking that these bits are set to 'ON' ('1'), the CPU 10 saves the user data stored in the respective blocks 40 with the block addresses '0' to '4' in the primary volume P-VOL, in the vacant blocks 41 in the differential volume D-VOL (in the example of FIG. 8B, the blocks 41 with the block addresses '0' to '4') as differential data as shown in FIG. 8B.

After that, the CPU 10 stores the block addresses (in the present example, '0' to '4') in the differential volume D-VOL where the relevant pieces of differential data are saved, in the corresponding save destination block address fields 44 (i.e., the save destination block address fields 44 corresponding to the block addresses '0' to '4') in the column 'SS1' in the snapshot management table 17; and resets the leftmost bits in the CoW bitmaps stored in the relevant CoW bitmap fields 43 (i.e., the CoW bitmap fields 43 corresponding to the block addresses '0' to '4') to 'OFF' ('0'). When a bit in a CoW bitmap is reset back to 'OFF' as above, even if a request to write user data in the relevant block 40 in the primary volume P-VOL is given from the host system 2, the copy-on-write processing is not performed in relation to the corresponding snapshot. When the series of steps for updating the snapshot management table 17 is over, the CPU 10 writes user data in the primary volume P-VOL.

Then, as shown in FIG. 9A, when the CPU 10 is given a data write request requesting that user data 'x' and 'y' be written in the blocks 40 with the block addresses '0' and '1' in the primary volume P-VOL respectively, it checks whether the corresponding bits in the corresponding CoW bitmaps in the snapshot management table 17 are set to 'ON,' based on the snapshot acquisition program 30. More specifically, the CPU 10 checks the values of the leftmost bits, which are associated with the first snapshot, in the CoW bitmaps in the snapshot management table 17, the CoW bitmaps corresponding to the blocks 40 with the block addresses '0' and '1' in the primary volume P-VOL.

Here, those bits are already set to 'OFF,' which means that it is unnecessary to save the user data respectively stored in the blocks 40 with the block addresses '0' and '1' in the primary volume P-VOL, in the differential volume D-VOL (copy-on-write). Therefore, the CPU 10 only executes data write processing where it updates the data in the blocks 40 with the block addresses '0' and '1' in the primary volume P-VOL with the new data 'x' and 'y' as shown in FIG. 9A, without having to execute copy-on-write.

After that, when the CPU 10 is given an order to obtain a second snapshot from the host system 2, it sets the second bits from the left, which are associated with the second snapshot, in the CoW bitmaps stored in the respective CoW bitmap fields 43 in the snapshot management table 17 to 'ON' ('1') as shown in FIG. 10C. It also stores the number of times copy-on-write was performed during the time between the first snapshot creation and the second snapshot creation in the CoW number-of-times field 45 associated with both the first snapshot and second snapshot in the snapshot management table 17.

After that, as shown in FIG. 11A, when the CPU 10 is given a data write request from the host system 2, requesting that user data 'f' be written in the block 40 with the block address '5' in the primary volume P-VOL, it checks, based on the snapshot acquisition program 30, the value of the second bit from the left, which is associated with the second snapshot, in the CoW bitmap corresponding to the block 40 with the block address '5' in the snapshot management table 17. In the present case, the value of that bit is '1,' accordingly, as shown in FIG. 11B, the CPU 10 saves the user data been stored in the block 40 with the block address '5' in the primary volume P-VOL in a vacant block 41 in the differential volume D-VOL (in the example shown in FIG. 11B, the block 41 with the block address being '5') as differential data.

The CPU 10 then clears the second bit from the left in the corresponding CoW bitmap in the snapshot management table 17 as shown in FIG. 11C and stores the block address of the block 41 in the differential volume D-VOL where the corresponding differential data is saved, in the corresponding save destination block address field 44 in the column of the save destination block address fields 44 associated with the second snapshot (i.e., the column SS2) in the snapshot management table 17.

Here, in the block 40 with the block address '5' in the primary volume P-VOL, the leftmost bit corresponding to the first snapshot in the corresponding CoW bitmap is also '1,' which means that there has been no change in the user data by the second snapshot acquisition time, i.e., the content of the data at the first snapshot acquisition time and that of the data at the second snapshot acquisition time is the same.

Here, the CPU 10 clears the leftmost bit in the CoW bitmap in the snapshot management table 17 corresponding to the block 40 with the block address '5' in the primary volume P-VOL. It also stores the block address, which is the same as the block address stored in the save destination block address field 44 associated with the block 41 with the block address '5' in the column of the save destination block address fields 44 associated with the second snapshot, in the corresponding save destination block address field 44 in the column of save destination block address fields 44 associated with the first snapshot (the column SS2).

When updating the snapshot management table 17 is complete, the CPU 10 has the user data written in the primary volume P-VOL.

Also, when the CPU 10 is given an order to obtain the third snapshot from the host system 31 it sets the third bits from the left, which are associated with the third snapshot, in the CoW bitmaps stored in the respective CoW bitmap fields 43 in the snapshot management table 17 to 'ON' ('1'). It also stores the number of times copy-on-write was performed during the time between the second snapshot creation and the third snapshot creation in the CoW number-of-times field 45 associated with the second snapshot and third snapshot in the snapshot management table 17.

After that, when the CPU 10 is given a data write request requesting that user data be written in the primary volume P-VOL, or a request to obtain the fourth snapshot from the host system 2, it performs the same processing as above.

Figures 13A, 13B, 13C:
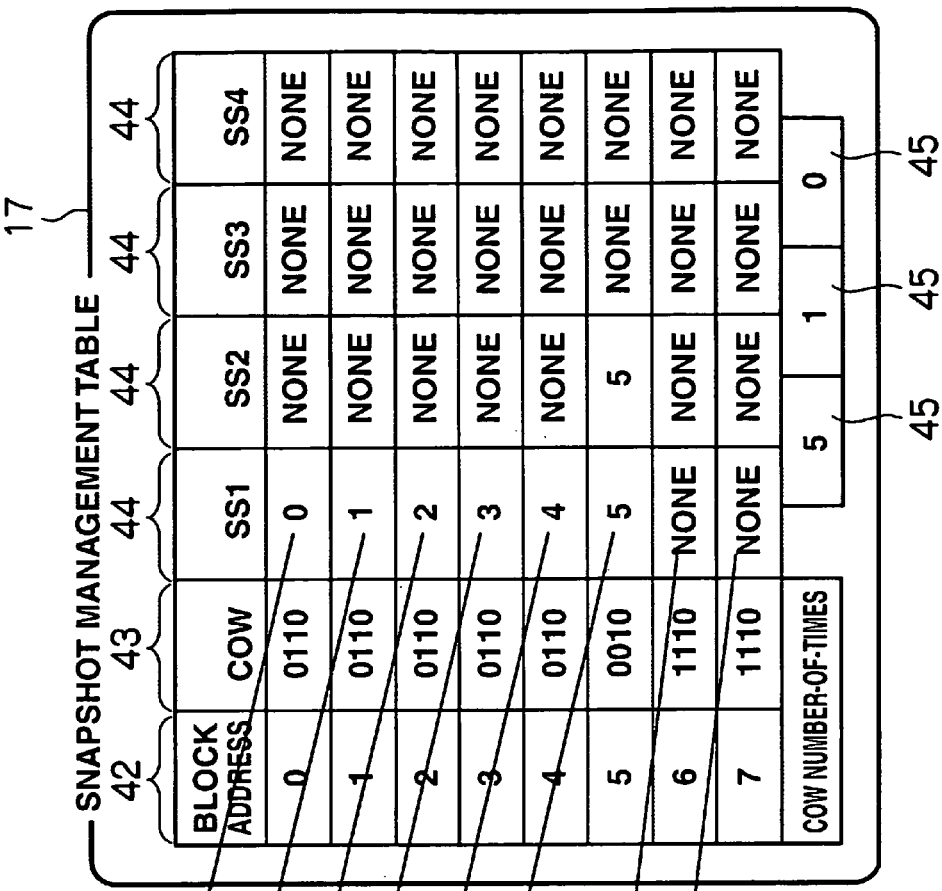
FIG. 13A is a conceptual diagram explaining snapshot acquisition processing.
FIG. 13B is a conceptual diagram explaining snapshot acquisition processing.
FIG. 13C is a conceptual diagram explaining snapshot acquisition processing.

The content of the processing performed by the CPU 10 when it is given a request for referring to the snapshots created as described above from the host system 2 will be explained. Here, the primary volume P-VOL and the differential volume D-VOL are in the state shown in FIGS. 13A and 13B and the snapshot management table 17 is in the state shown in FIG. 13C.

What is used when performing the processing to refer to an obtained snapshot is: the bits in the CoW bitmaps stored in the respective CoW bitmap fields 43 in the snapshot management table 17, the bits associated with the designated snapshot; and the data in the respective save destination block address fields 44 in the column associated with the designated snapshot from among the columns SS1 to SS4 in the snapshot management table 17.

When the CPU 10 is given a request to refer to an obtained snapshot from the host system 2, it reads the bits associated with the designated snapshot from among the CoW bitmaps stored in the respective CoW bitmap fields 43 in the snapshot management table 17, in the order of their block addresses ('0' to '7'). More specifically, when the PCU 10 is given a request to refer to the first snapshot, it reads the leftmost bits in the CoW bitmaps stored in the respective CoW bitmap fields 43 in the foregoing order.

For each of the bits read from the CoW bitmap fields 43 corresponding to the respective blocks 40 in relation to the designated snapshot, if it is set to 'ON' ('1') as above, the CPU 10 reads the data in the corresponding block 40 from the primary volume P-VOL (see FIG. 13A) and maps the data onto the corresponding block in the designated snapshot. Whereas, if it is set to 'OFF' ('0'), the CPU 10 reads the data in the relevant block 41 from the differential volume D-VOL (see FIG. 13B) and maps the data onto the corresponding block in the designated snapshot. Through this mapping processing, the designated snapshot can be reproduced.

Figure 14:
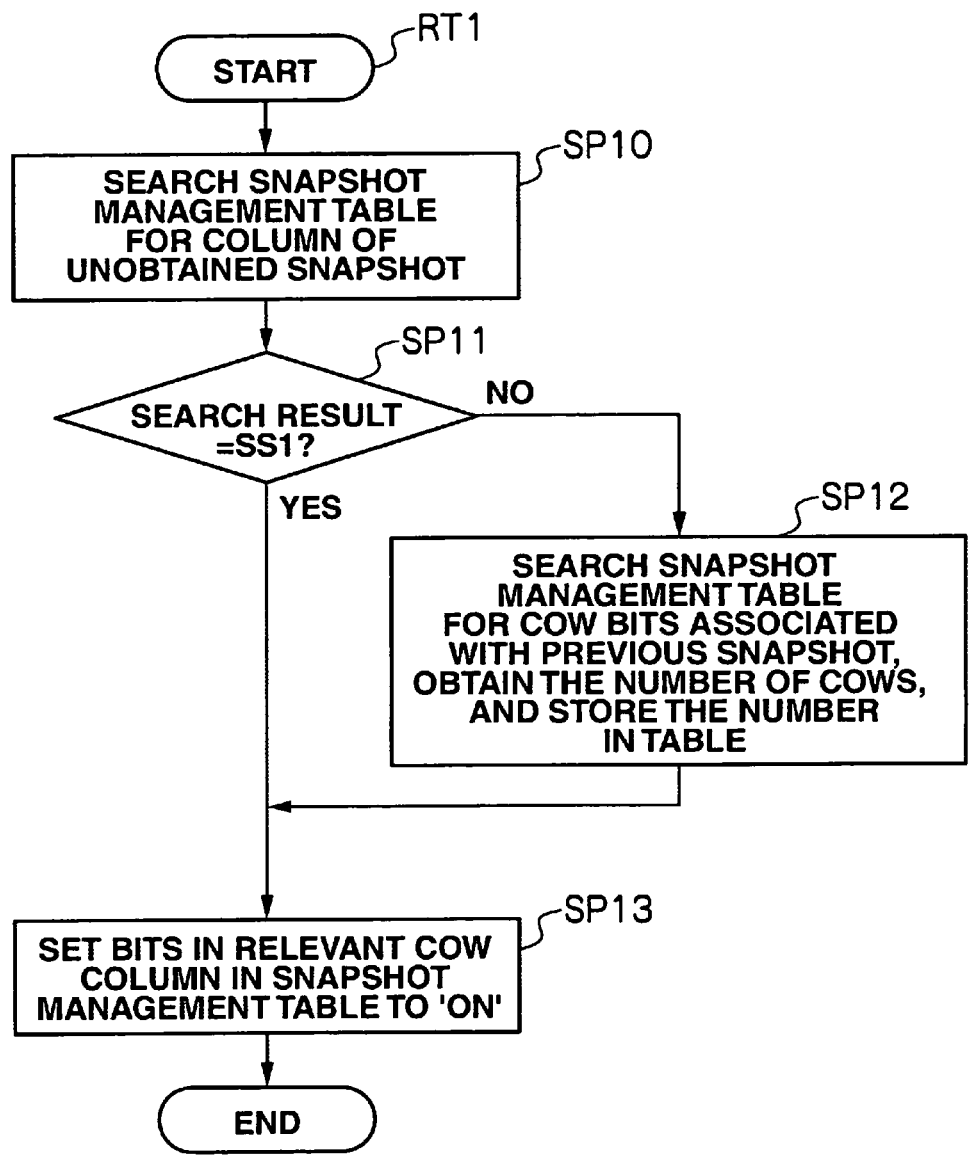
FIG. 14 is a flowchart showing a snapshot acquisition processing routine.

FIG. 14 is a flowchart showing the content of the processing performed by the CPU 10 in relation to the foregoing snapshot acquisition processing. The CPU 10 obtains a snapshot based on the snapshot acquisition program 30 (FIG. 4) stored in the memory 11 (FIG. 4) according to a snapshot processing routine RT1 shown in FIG. 14.

More specifically, when the CPU 10 is called by a first mounting/file-sharing configuration setting program 31 (FIG. 4), which will be described later, the CPU 10 starts the snapshot creation processing, in which it first searches the snapshot management table 17 for an un-obtained snapshot (SP10).

The CPU 10 then judges whether the first snapshot was detected by the search (i.e., whether the first snapshot is already obtained or not) (SP11), and if the judgment is positive, it sets the bits (in the present case, the leftmost bits) corresponding to the acquisition target snapshot (in the present case, the first snapshot) in the CoW bitmaps stored in the respective CoW bitmap fields 43 in the snapshot management table 17 to 'ON' ('1') (SP13). The CPU 10 then terminates the snapshot acquisition processing.

On the other hand, if the judgment in step SP11 is negative, the CPU 10 counts the number of bits that are associated with the snapshot previous to the acquisition target snapshot and are set to 'ON,' from among the bits in the CoW bitmaps stored in the respective CoW bitmap fields 43 in the snapshot management table 17. As a result, the CPU 10 obtains the number of blocks for which the copy-on-write processing has been performed since the acquisition/disclosure time of the previous snapshot until the present time. The CPU 10 then stores the number of blocks obtained above in the CoW number-of-times field 45 associated with both the previous snapshot and the acquisition target snapshot in the snapshot management table 17 (SP12).

The CPU 10 then sets, from among the CoW bitmaps stored in the respective CoW bitmap fields 43 in the snapshot management table 17, the bits corresponding to the acquisition target snapshot to 'ON' ('1') (SP13). Then, it terminates the snapshot acquisition processing.

1-2-2-2. Mounting/File-Sharing Configuration Setting Processing

Next, snapshot mounting/file-sharing configuration setting processing by the NAS apparatus 4 will be explained.

The first mounting/file-sharing configuration setting program 31 for snapshots (FIG. 4) is called by the job scheduler 18 on a regular basis and judges whether a snapshot, mounted and with a file-sharing configuration set, is necessary or not and if the snapshot is unnecessary, it unmounts the snapshot and cancels the its file-sharing configuration.

Figure 15:
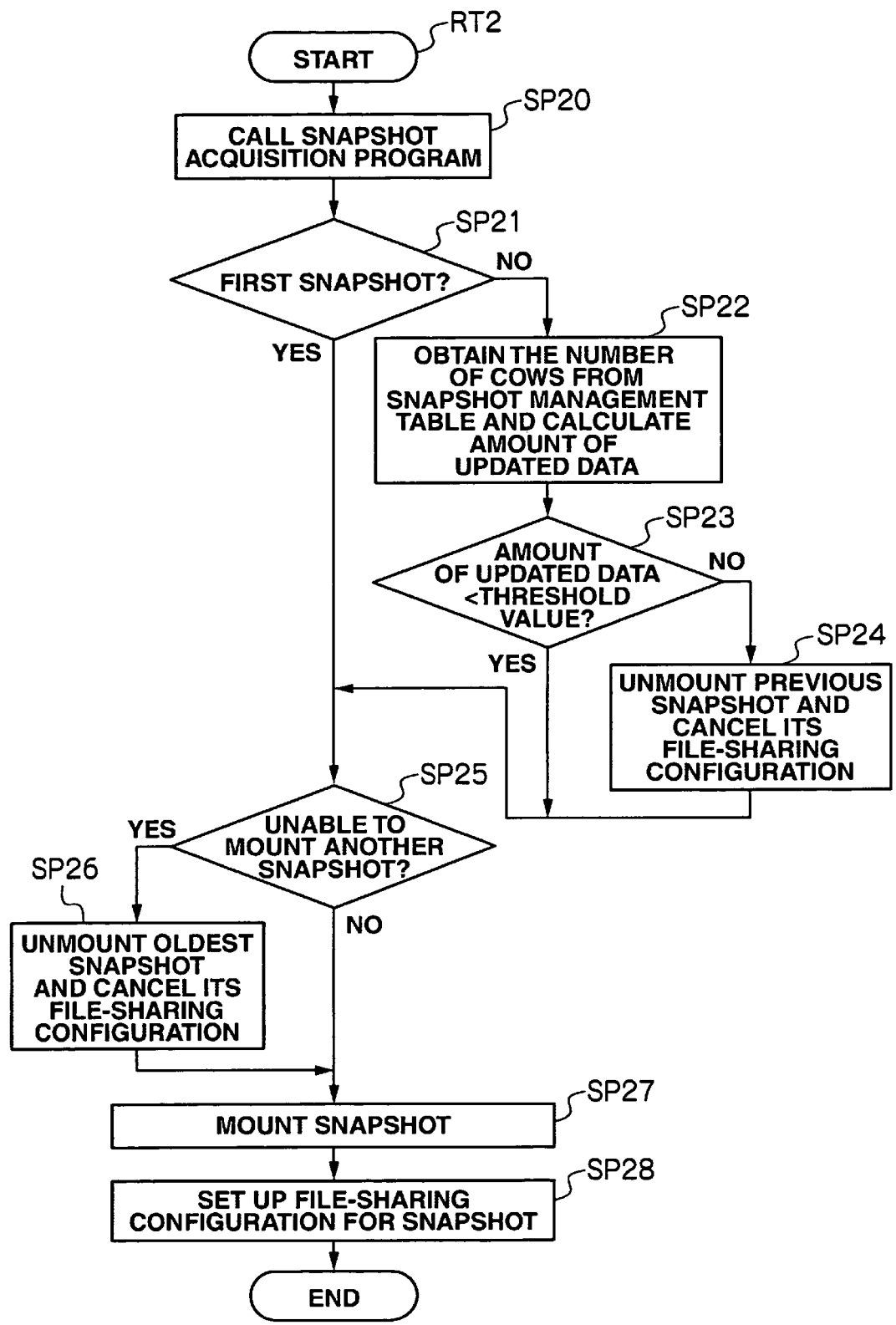
FIG. 15 is a flowchart showing a first mounting/file-sharing configuration setting processing routine.

FIG. 15 is a flowchart showing the content of the processing performed by the CPU 10 in relation to the mounting and file-sharing configuration setting processing for snapshots. Based on the first mounting/file-sharing configuration setting program 31 (FIG. 4) stored in the memory 11 (FIG.4), the CPU 10 executes the mounting and file-sharing configuration setting processing for snapshots according to a first mounting/file-sharing configuration setting processing routine RT2 shown in FIG. 15.

More specifically, when the CPU 10 receives an order to execute the snapshot function, the order being given on a regular basis from the job scheduler 18, it starts the first mounting/file-sharing configuration setting processing routine RT2, in which it first calls the snapshot acquisition program 30 (FIG. 4) and obtains a new snapshot (SP20).

The CPU 10 then judges whether the obtained snapshot is the first snapshot (SP21). If the judgment is negative, the CPU 10 reads the number of copy-on-writes stored in the corresponding CoW number-of-times field 45 in the snapshot management table 17 and multiplies the number by the block size of a block 40 (FIG. 5A) in the primary volume P-VOL to obtain the amount of updated data saved in the differential volume D-VOL during the time between the first snapshot acquisition and the snapshot acquisition in step SP20 (SP22).

The CPU 10 then judges whether the amount of updated data obtained above is larger than the aforementioned updated-data-amount threshold value (SP23), and if the judgment is negative, it unmounts the previous snapshot and cancels its file-sharing configuration (SP24).

On the other hand, if the judgment in step SP21 or step SP23 is positive, or if the processing in step SP24 is complete, the CPU 10 judges whether it can mount another snapshot (SP25).

If the judgment is negative, the CPU 10 proceeds to step SP26, however, if the judgment is positive, it unmounts the oldest snapshot and cancels its file-sharing configuration (SP26).

After that, the CPU 10 mounts the snapshot obtained in step SP20 (SP27), sets up a file-sharing configuration for it (SP28), and terminates the series of steps in the mounting/file-sharing configuration setting processing.

Incidentally, the file-sharing configuration set in step SP27 has two configuration types—the Common Internet File System (CIFS) sharing configuration, which enables a host system 2 using Windows (registered trademark) as its OS to access snapshots, and the Network File System (NFS) sharing configuration, which enables a host system 2 using UNIX (registered trademark) as its OS to access the snapshots.

With the CIFS sharing configuration, the host system 2 (Windows client) can refer to the snapshots only by the file-sharing configuration being set in the NAS apparatus 4; however, with the NFS sharing configuration, the configuration also has to be set for the host system 2 (UNIX client). Setting up the configuration is necessary for the host system 2 to refer to the file systems (snapshots) located in remote place (NAS apparatus 4) and is called remote mounting or NFS mounting.

During the mounting/file-sharing configuration setting processing or unmounting/file-sharing configuration cancellation processing on the NAS apparatus 4 side, if a snapshot is mounted or unmounted and the NFS sharing configuration setting therefor is set or cancelled, the host system 2, a UNIX client, has to be notified of that fact. Having received the notification, the host system 2 sets up or cancels the remote mount (NFS mount) configuration. An example of the information notified in this situation is an added or deleted mount point (directory).

Figure 16:
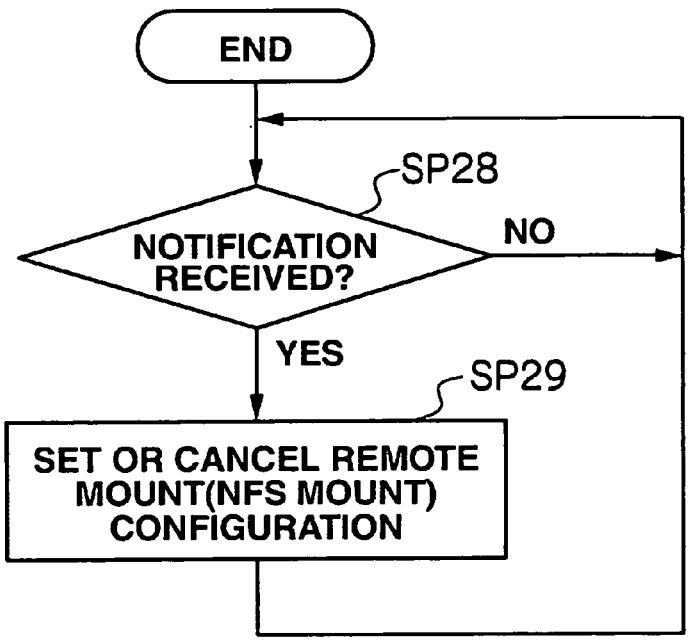
FIG. 16 is a flowchart explaining remote mount setting/cancelling in a host system.

FIG. 16 is a flowchart showing the content of the processing performed by the host system 2, a UNIX client, in relation to setting and cancelling of the remote mount (NFS mount) configuration. Normally, the host system 2, a UNIX client, waits until it receives the foregoing notification sent from the NAS apparatus 4 (the CPU 10 in the NAS apparatus 4) (SP28) and, when it receives the notification, it sets up or cancels the remote mount (NFS mount) configuration (SP29).

1-3. Effects of Embodiment 1

With the foregoing configuration, the NAS apparatus 4 obtains a snapshot on a regular basis, mounts it, sets up a file-sharing configuration for it, and makes it public to the users. Here, the NAS apparatus 4 also calculates the amount of updated data saved in a differential volume D-VOL during the time between the acquisition of a previous snapshot and that of the current snapshot and, if the amount is smaller than the updated-data-amount threshold value, it unmounts the previous snapshot and cancels its file-sharing configuration.

Accordingly, with the storage system 1, a snapshot is mounted and a file-sharing configuration for it set only when there is a certain degree of difference between the two successively obtained snapshots, and if the two snapshots have roughly the same content, the previous snapshot of the two is deleted (i.e., the snapshot is unmounted and its file-sharing configuration cancelled). Accordingly, even though the number of snapshots to be mounted is limited, snapshots covering the long-term content can be provided to the users.

2. Embodiment 2

Figure 17:
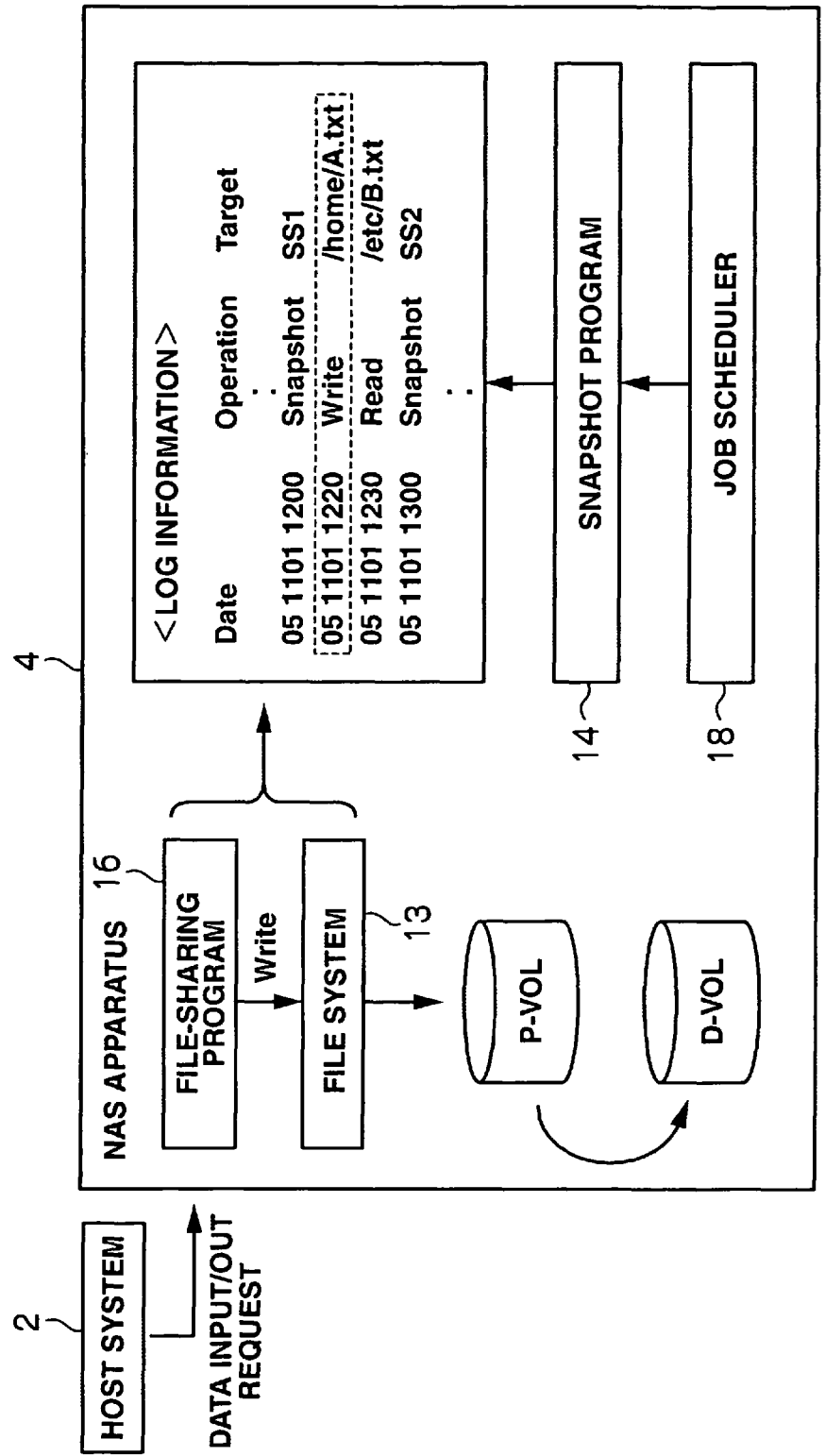
FIG. 17 is a conceptual diagram explaining the outline of the snapshot function according to Embodiment 2.

As shown in FIG. 17, when the logs for file update by user accesses and the logs for snapshot acquisition by the snapshot function are consolidated by the file-sharing program 16 (FIG. 1) and the file system 13 (FIG. 1) within the NAS apparatus 4, it is possible to obtain, from the information for the logs (the log information), information such as the number of files or directories updated or created during the time between the acquisition of two successive snapshots. Thereupon, in a storage system 50 (FIG. 1) according to Embodiment 2 of this invention, whether or not to mount a snapshot and set up a file-sharing configuration for it is determined according to the number of updated files/directories, instead of the amount of updated data saved in a differential volume D-VOL.

Here, in the example shown in FIG. 17, if a threshold value for the number of files/directories (hereinafter called 'file/directory-number threshold value') is set so that 'when three or more files have been updated between two successive snapshots, the previous snapshot is not unmounted and its file-sharing configuration is not cancelled,' the number of file updates (see the log where 'Write' is written in the 'Operation' section in the log information) performed during the time between the first snapshot (SS1) acquisition and the second snapshot (SS2) acquisition is just one, as shown in FIG. 17 with the dash line. Therefore, the first snapshot is unmounted and its file-sharing configuration is cancelled and then the second snapshot is mounted and a file-sharing configuration for it is set.

However, once the snapshot is unmounted and its file-sharing configuration cancelled, the users cannot refer to the snapshot unless the system administrator manually mounts it again and sets up a file-sharing configuration for it. Consequently, for example, if the same file had been updated before and after unmounting the snapshot, there is a problem in that the users cannot refer to the content of the file before the unmounting of the snapshot.

So in the storage system 50 according to Embodiment 2, when unmounting a snapshot in the NAS apparatus 51, if a file has been updated during the time between the acquisition of the snapshot and that of the next snapshot, the post-update file (in the example shown in FIG. 17, the file '/home/A.txt' surrounded with a dash line) is copied to a directory for which a different file-sharing configuration is set. Thereby, in Embodiment 2, the post-update file can be referred to without having to mount all the snapshots.

FIG. 18 is a flowchart showing the content of the processing performed by the CPU 10 in the NAS apparatus 51 in relation to the mounting and file-sharing configuration setting processing for snapshots according to Embodiment 2. Based on a second mounting/file-sharing configuration setting program 53 (FIG. 4) constituting a snapshot program 52, instead of the first mounting/file-sharing configuration setting program 31 according to Embodiment 1, the CPU 10 executes the mounting/file-sharing configuration setting processing according to Embodiment 2 in accordance with a second mounting/file-sharing configuration setting processing routine RT3 shown in FIG. 18.

More specifically, when the CPU 10 receives an order to execute the snapshot function, the order being given on a regular basis from the job scheduler 18, it executes the second mounting/file-sharing configuration setting processing routine RT3, in which it first calls the snapshot acquisition program 30 (FIG. 4) and obtains a new snapshot (SP30).

The CPU 10 then judges whether the obtained snapshot is the first snapshot (SP31). If the judgment is negative, the CPU 10 obtains, from the foregoing log information, the number of files that have been updated during the time between the acquisition of the previous snapshot and that of the current snapshot obtained in step SP30 (SP32). Incidentally, in the following explanation, a file that has been updated is called an 'updated file' and the number of updated files is called the 'updated file number.'

The PCU 10 then judges whether the updated-file number is larger than a predetermined threshold value (SP33). If the judgment is negative, the CPU 10 identifies, based on the foregoing log information, the updated file that has been updated during the time between the acquisition of the previous snapshot and that of the current snapshot obtained in step SP30; copies the updated file to the directory that is set, in advance, as a save destination for the updated file; and unmounts the previous snapshot and cancels its file-sharing configuration (SP34).

On the other hand, if the judgment in step SP31 or SP33 is positive, or if the processing in step SP34 is over, the CPU 10 judges whether it can mount another snapshot (SP35).

If the judgment is negative, the CPU 10 proceeds to step SP37, however, if the judgment is positive, it unmounts the oldest snapshot from among the snapshots currently mounted and cancels its file-sharing configuration (SP36).

The CPU 10 then mounts the snapshot obtained in the snapshot acquisition processing in step SP30 (SP37) and, after setting up a file-sharing configuration for the snapshot (SP38), terminates the series of steps in the mounting/file-sharing configuration setting processing.

Accordingly, with the storage system 50 according to Embodiment 2, when unmounting a snapshot in the NAS apparatus 51, if a file has been updated during the time between the acquisition of the snapshot and that of the next snapshot, the post-update file is copied to a directory for which a different file-sharing configuration is set. Therefore, even after the previous snapshot is unmounted, the users can refer to the post-update file, which results in improving the user convenience.

3. Embodiment 3

With the NAS apparatus 4 according to Embodiment 1, in step SP24 in the first mounting/file-sharing configuration setting processing routine RT2 described in relation to FIG. 14, when the amount of updated data saved in a differential volume D-VOL during the time between the acquisition of two successive snapshots is smaller than a updated-data-amount threshold value, the previous snapshot is unmounted and its file-sharing configuration is cancelled before mounting the new snapshot and setting up a file-sharing configuration for it. Meanwhile, according to Embodiment 3, this processing is performed non-concurrently with other processing, i.e., unmounting of a snapshot and cancelling of its file-sharing configuration are performed at a different time to the mounting of a new snapshot and setting of its file-sharing configuration.

Figure 19:
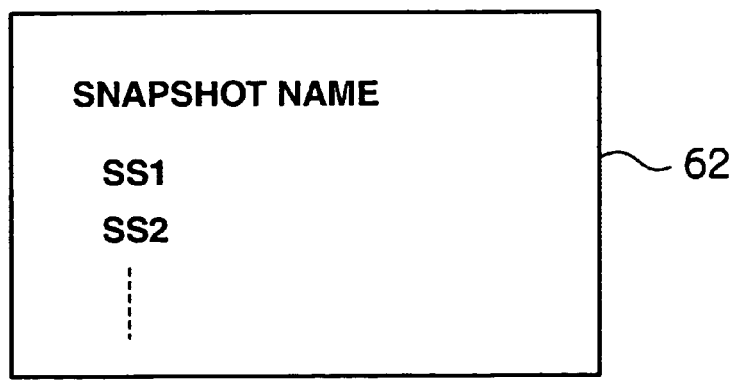
FIG. 19 is a conceptual diagram explaining a deletion candidate list.

More specifically, in a storage system 60 according to Embodiment 3, a memory 11 in the NAS apparatus 61 stores a deletion candidate list 62 as shown in FIG. 19 and, when the NAS apparatus 61 mounts a snapshot and sets up a file-sharing configuration for it, it registers a snapshot which becomes a target for unmounting and file-sharing configuration cancellation in the foregoing deletion candidate list 62 so that it can perform, on a regular basis, the processing to collectively unmount the respective snapshots registered in the list 62 and cancel their file-sharing configurations in a different batch job.

Incidentally, regarding the timing to execute the processing to unmount the respective snapshots registered in the foregoing deletion candidate list 62 and cancel their file-sharing configurations, the processing may be performed on a regular basis as mentioned above, or at other times, for example, when the future number of snapshots that can be mounted becomes smaller than a predetermined floor limit value.

Figure 20:
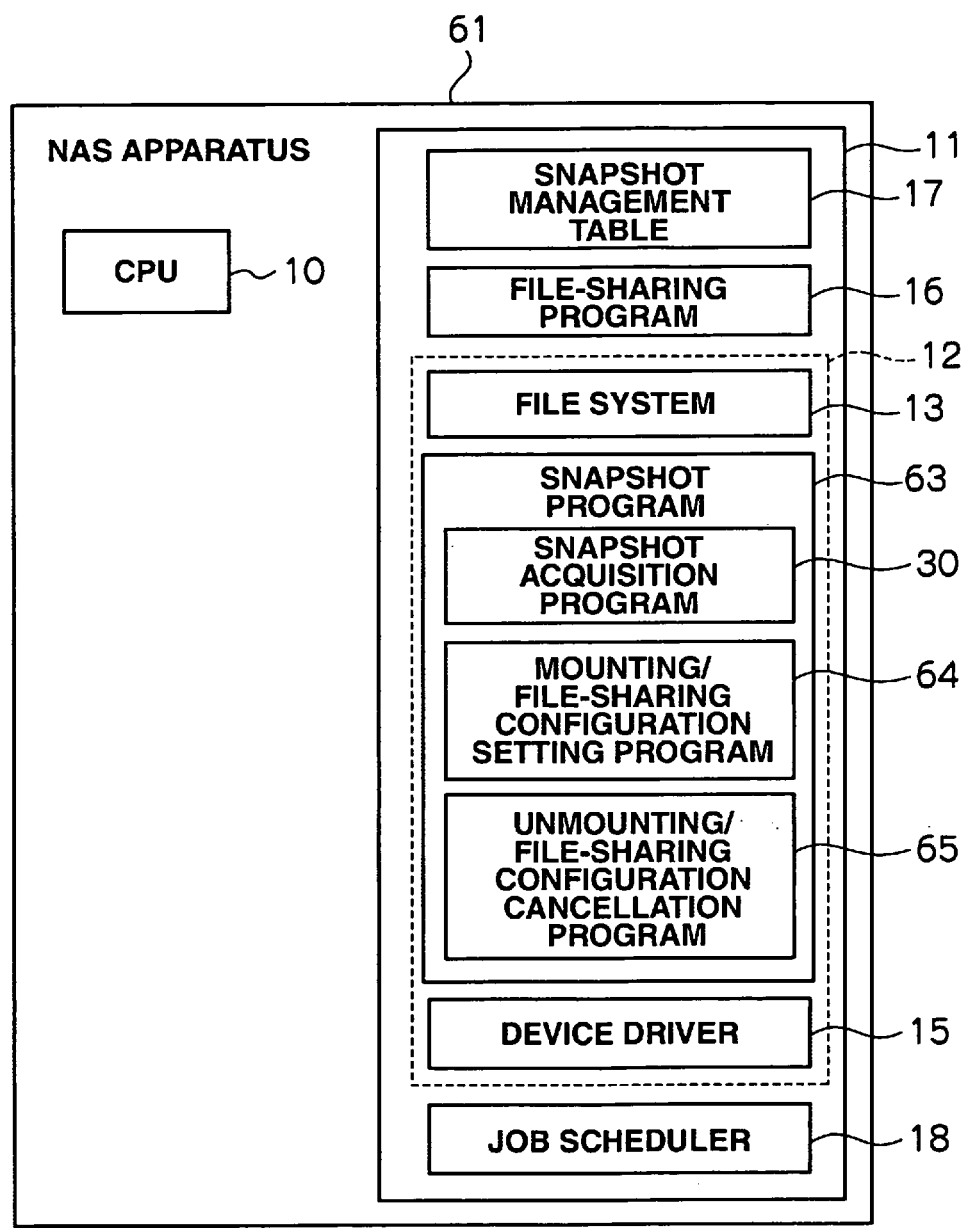
FIG. 20 is a block diagram showing the schematic configuration of the NAS apparatus according to Embodiment 3.

FIG. 20, which is given the same reference numerals for components corresponding to FIG. 4, shows the schematic configuration of the NAS apparatus 61 according to Embodiment 3, the apparatus 61 having the foregoing snapshot function. The NAS apparatus 61 is configured the same way as the NAS apparatus 4 according to Embodiment 1 except that it has, in the snapshot program 63 loaded therein, a third mounting/file-sharing configuration setting program 64, instead of the first mounting/file-sharing configuration setting program 31 (FIG. 4), and it also has, in the snapshot program 72, an unmounting/file-sharing configuration cancellation program 65 for unmounting the snapshots registered in the deletion candidate list 62 and cancelling their file-sharing configurations.

Based on the third mounting/file-sharing configuration setting program 64 stored in the memory 11, the CPU 10 in the NAS apparatus 61 executes the foregoing mounting/file-sharing configuration setting processing according to Embodiment 3, according to a third mounting/file-sharing configuration setting processing routine RT4.

More specifically, the CPU 10 performs steps SP40 to SP42 in the third mounting/file-sharing configuration setting processing routine RT4 in the same manner as in steps SP20 to SP23 in the second mounting/file-sharing configuration setting processing routine RT2 described above in relation to FIG. 16.

If the judgment in step SP43 is negative, the CPU 10 adds the name of the snapshot mounted most recently to the deletion candidate list 62 (SP44) and performs steps SP45 to SP48 in the same manner as in steps SP24 to SP27 in the foregoing second mounting/file-sharing configuration setting processing routine RT2.

Figure 22:
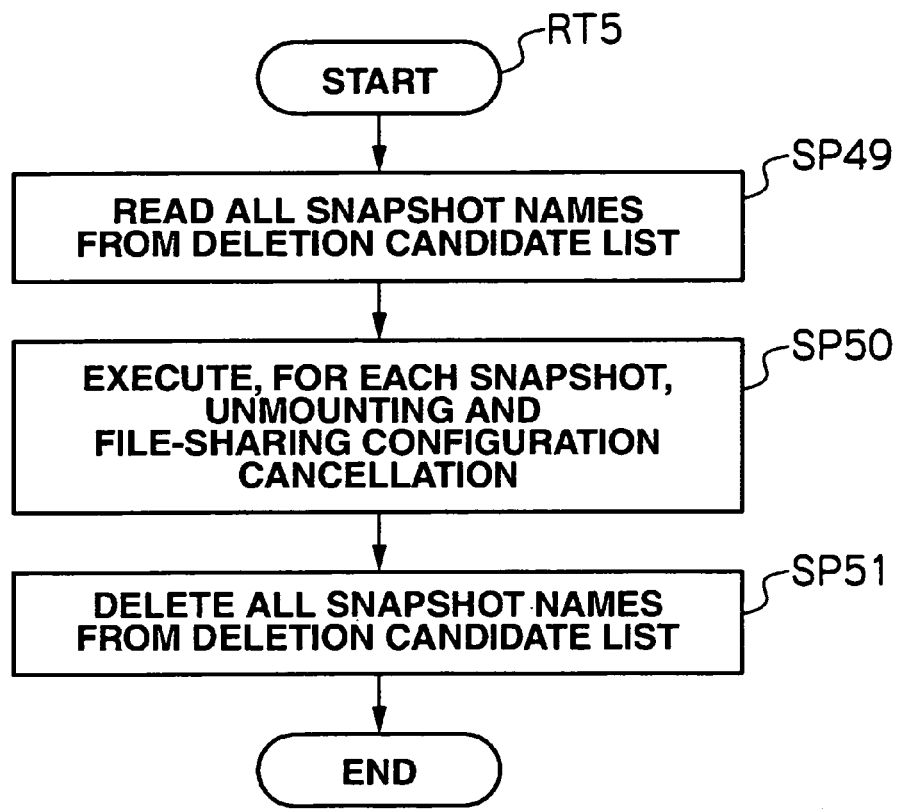
FIG. 22 is a flowchart showing unmounting/file-sharing configuration cancellation processing.

Meanwhile, in response to an order to execute unmounting/file-sharing configuration cancellation processing, the order being given from the job scheduler 18 (FIG. 1) on a regular basis, and based on the foregoing unmounting/file-sharing configuration cancellation program 65 stored in the memory 11, the CPU 10 executes the unmounting/file-sharing configuration cancellation processing for all the snapshots registered in the deletion candidate list 62, according to an unmounting/file-sharing configuration cancellation processing routine RT5 shown in FIG. 22.

More specifically, when the CPU 10 receives an order to execute the unmounting/file-sharing configuration cancellation processing from the job scheduler 18, it starts the unmounting/file-sharing configuration cancellation processing routine RT5, in which, it first reads all the snapshot names registered in the deletion candidate list 62 (SP49).

Subsequently, the CPU 10 unmounts the snapshots corresponding to the respective snapshot names read from the deletion candidate list 62 and cancels their file-sharing-configurations (SP50).

The CPU 10 then deletes the snapshot names from the deletion candidate list 62 (SP51) and then terminates the unmounting/file-sharing configuration cancellation processing.

Thus, with the storage system 60 according to Embodiment 3, during the mounting/file-sharing configuration setting processing, unmounting of unnecessary snapshots and cancelling of their file-sharing configurations are performed in asynchronization with other processing. Accordingly, if the CPU 10 performs the unmounting/file-sharing configuration cancellation processing when it is not busy, the load on the CPU 10 caused by the mounting/file-sharing configuration setting processing can be reduced.

4. Embodiment 4

If the storage system 60 according to Embodiment 3 has the configuration where snapshots of a plurality of file systems are managed with one snapshot management table 17 and the judgment as to whether or not to mount or unmount snapshots is performed collectively, when giving consideration to the fact that a plurality of users access different snapshots respectively, there is a problem in that a large number of snapshots of frequently-accessed and frequently-updated file systems are mounted and remain in the NAS apparatus while snapshots of infrequently-accessed and infrequently-updated file systems are unmounted and so there are hardly any snapshots of such file systems left the NAS apparatus.

So with a storage system 70 (FIG. 1) according to Embodiment 4, giving consideration to the number of accessing users, only snapshots of file systems having a small updated-data amount and a small number of accessing users are unmounted. Accordingly, with this storage system 70, even a snapshot of an infrequently-accessed file system stays mounted, and its file-sharing configuration is maintained.

Figure 23:
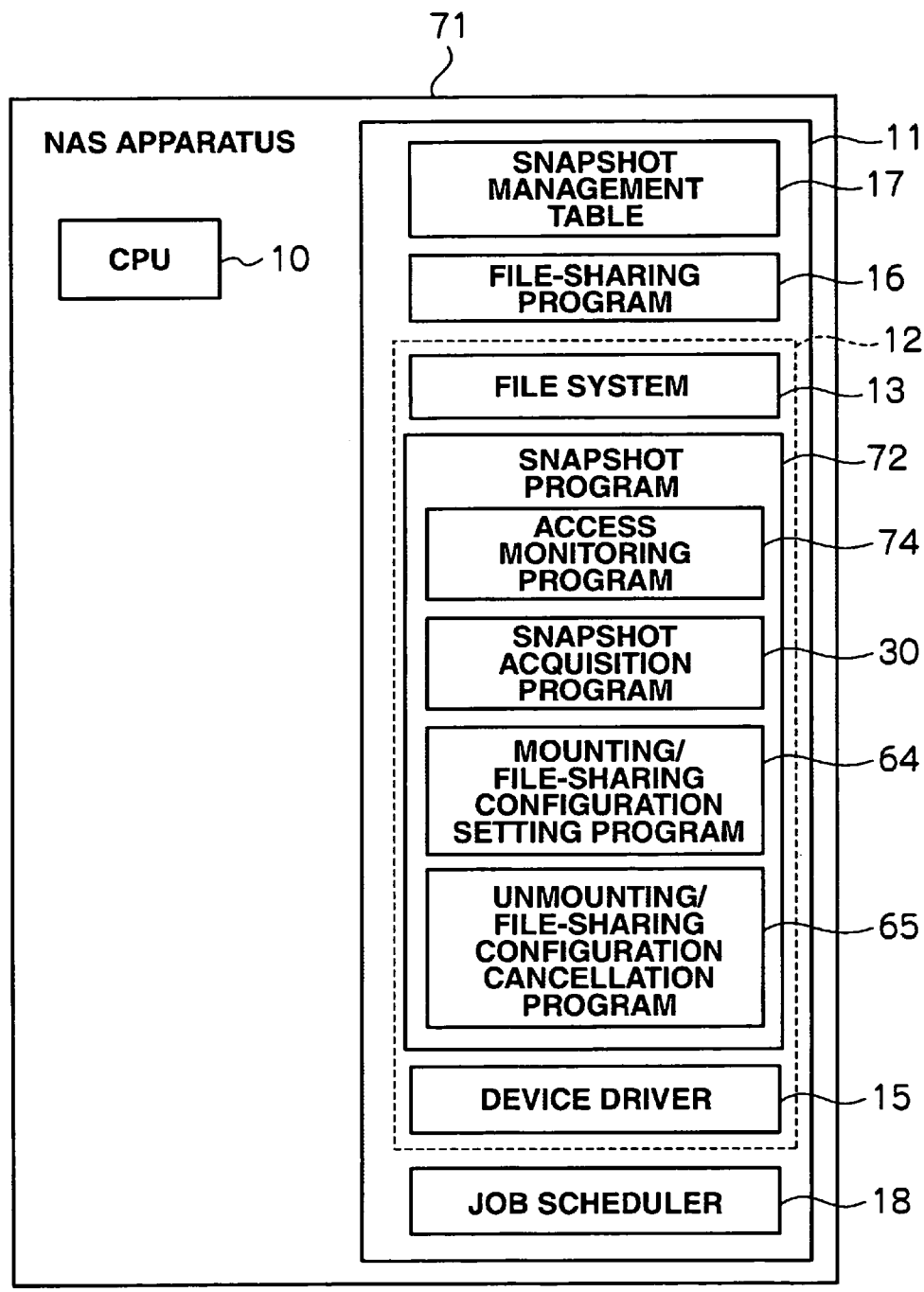
FIG. 23 is a block diagram showing the schematic configuration of the NAS apparatus according to Embodiment 4.

FIG. 23, which has been given the same reference numerals for components corresponding to those in FIG. 20, shows the schematic configuration of a NAS apparatus 71 according to Embodiment 4 having the foregoing snapshot function. The NAS apparatus 71 is configured the same way as the storage system 60 according to Embodiment 3, except that it has, in a snapshot program 72 loaded therein, a fourth mounting/file-sharing configuration setting program 73 instead of the third mounting/file-sharing configuration setting program 64 (FIG. 20); and that it also has, in the snapshot program 72, an access monitoring program 74 for monitoring the frequency of access from users to the respective snapshots.

Figure 24:
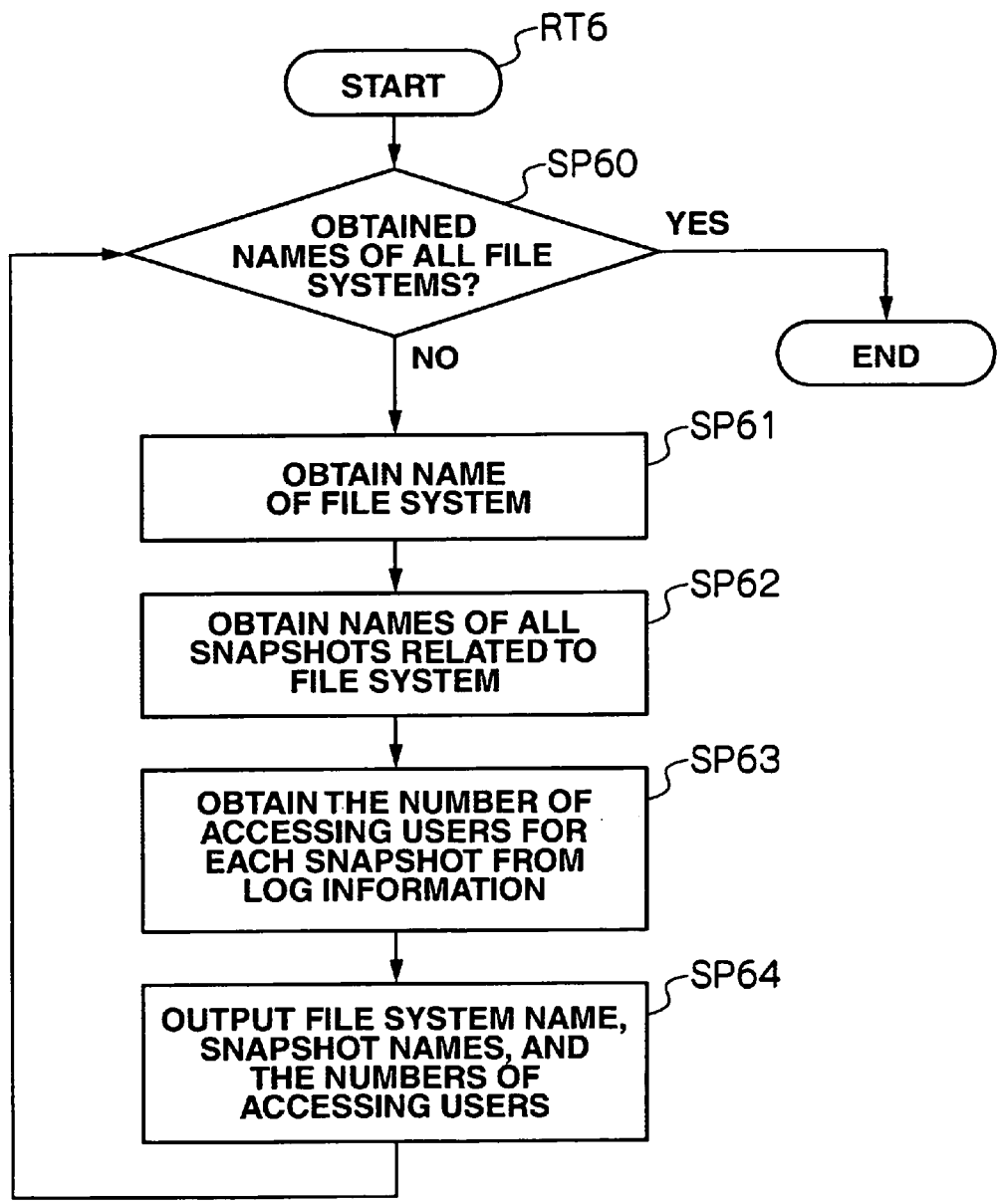
FIG. 24 is a flowchart showing an access monitor processing routine.

Based on the access monitoring program 74 stored in the memory 11, the CPU 10 in the NAS apparatus 71 monitors the number of accesses from users per certain period of time (e.g., per day) to the respective snapshots according to an access monitor processing routine RT6 shown in FIG. 24.

In other words, when the CPU 10 receives an order to execute the access monitor processing, which is given at regular time intervals as described above from the job scheduler 18 (FIG. 23), it judges whether it has obtained the names of all the file systems accessed by the users, based on the log information (SP60).

If the judgment is negative, the CPU 10 obtains the name of one file system accessed by the users based on the log information (SP61) and obtains from the log information the names of all the snapshots that are related to that file system and that were accessed by the users (SP62).

Subsequently, for each of the snapshots corresponding to the snapshot names obtained in step SP62, the CPU 10 obtains the number of users who accessed it (SP63) and then outputs the file system name, snapshot names, and the numbers of accessing users obtained in steps SP61 to SP63 in the fourth mounting/file-sharing configuration setting program 73 (SP64).

The CPU 10 then repeats the same steps (SP60 to SP64 and back to SP60). When it obtains the names of all the file systems accessed by the users in a certain period of time, i.e., when the judgment in step SP60 is positive, it terminates the access monitor processing.

Figure 25:
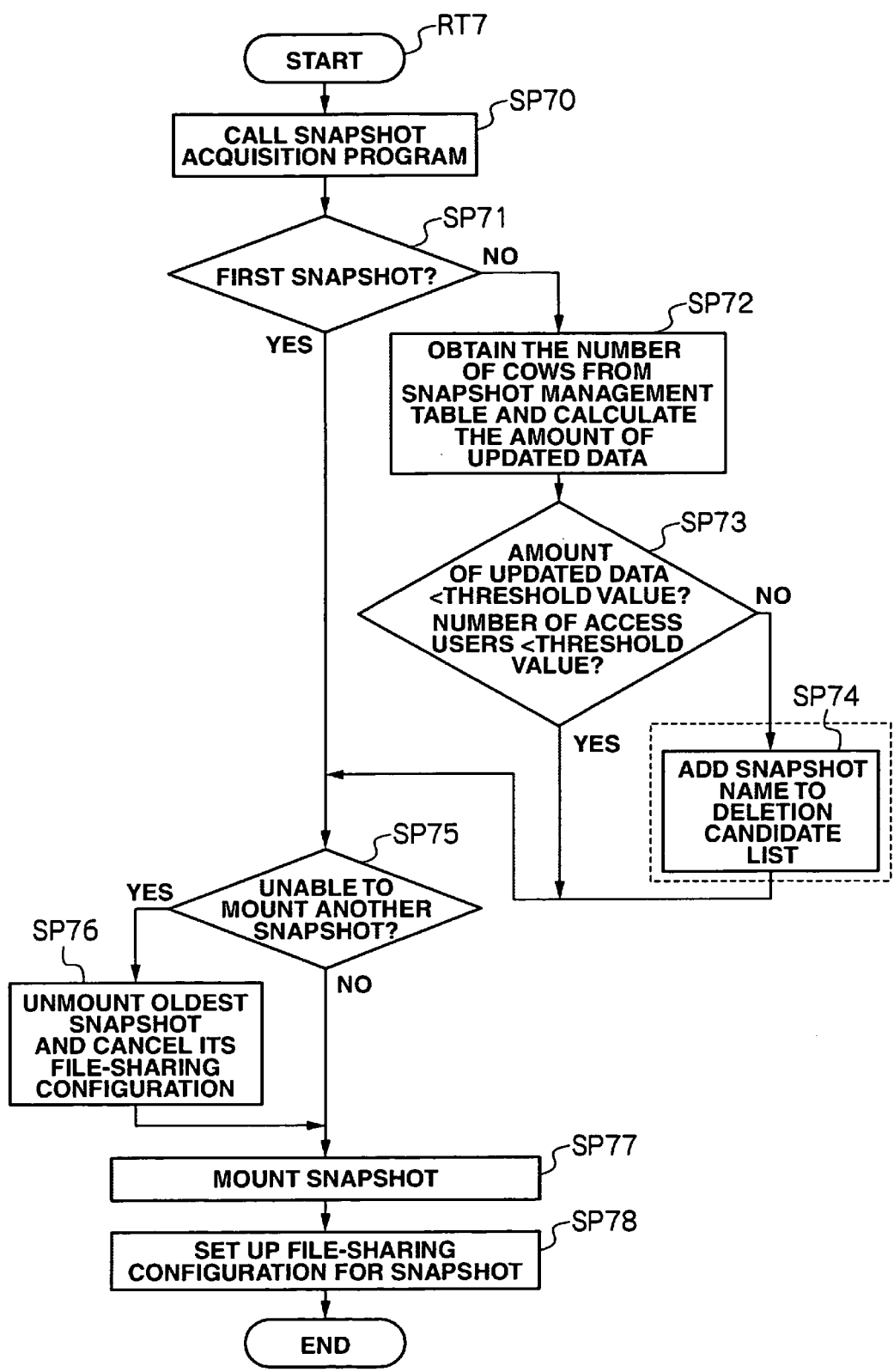
FIG. 25 is a flowchart showing a fourth mounting/file-sharing configuration setting processing routine.

FIG. 25 is a flowchart showing the content of the mounting/file-sharing configuration setting processing performed by the CPU 10 based on the aforementioned fourth mounting/file-sharing configuration setting program 73 stored in the memory 11.

Figure 21:
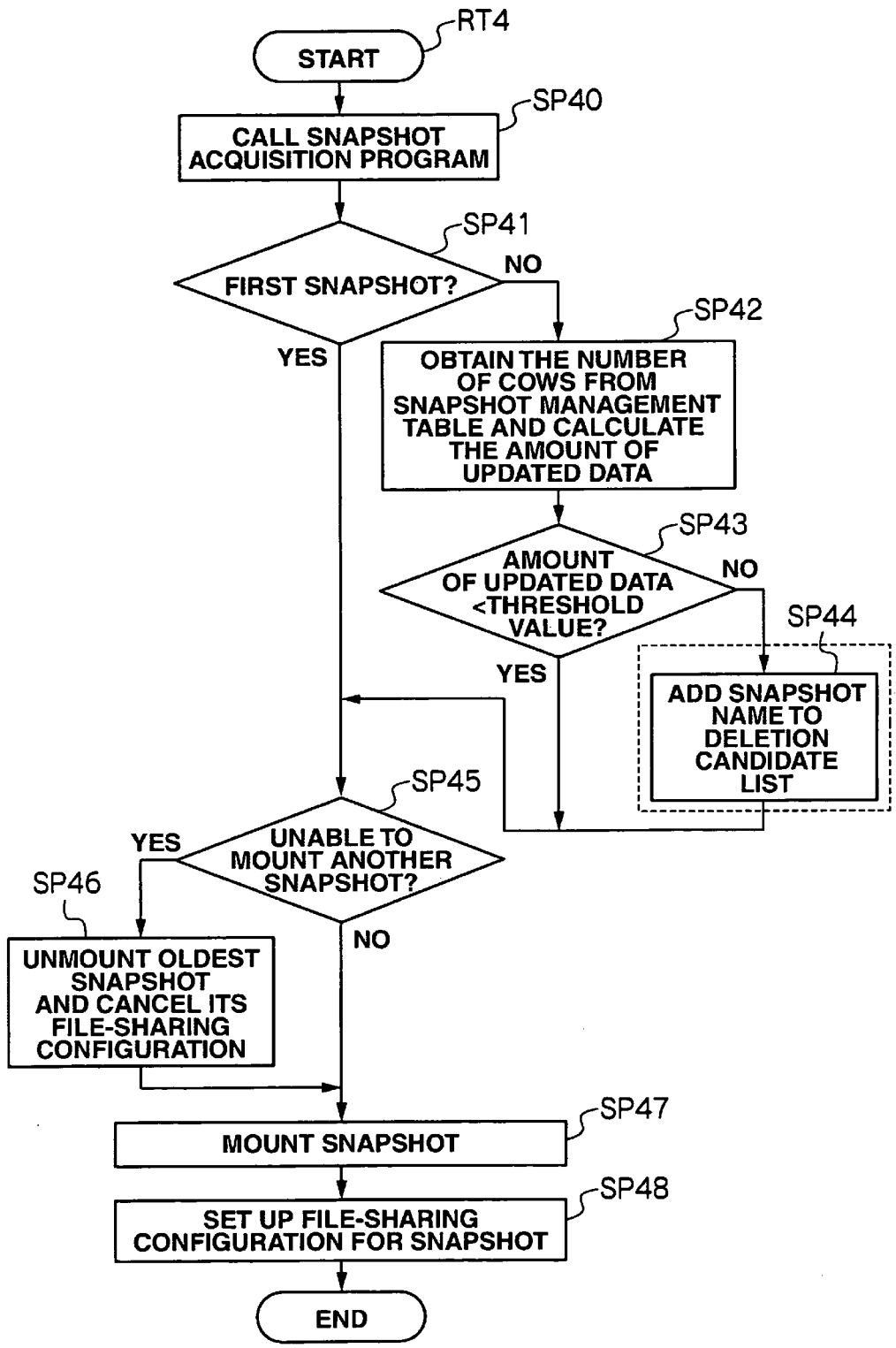
FIG. 21 is a flowchart showing a third mounting/file-sharing configuration setting processing routine.

When the CPU 10 receives an order to execute the mounting/file-sharing configuration setting processing, the order being given on a regular basis from the job scheduler 18, it starts a fourth mounting/file-sharing configuration setting processing routine RT7 shown in FIG. 25 and performs steps SP70 to SP72 in the same manner as in steps SP40 to SP42 in the third mounting/file-sharing configuration setting processing routine RT4 described with reference to FIG. 21.

Then, based on the number of CoWs read from the relevant CoW number-of-times field 45 (FIG. 5) in the snapshot management table 17 in step SP73, the CPU 10 judges whether the amount of updated data saved in the differential volume D-VOL during the time between the acquisition of the previously-mounted snapshot and that of the current snapshot is smaller than the predetermined updated-data-amount threshold value, as well as whether the number of accessing users for the previously-mounted snapshot is also smaller than a predetermined threshold value for the number of accessing users (hereinafter called 'access-user-number threshold value') (SP73).

If the judgment in step SP73 is negative, the CPU 10 proceeds to step SP75, whereas, if the judgment is positive, it adds the name of the previously-mounted snapshot to the deletion candidate list 62 (FIG. 19) and proceeds to step SP75. The CPU 10 then performs steps SP75 to SP78 in the same manner as in steps SP40 to SP42 in the third unmounting/file-sharing configuration cancellation processing routine RT4.

Thus, based on the unmounting/file-sharing configuration cancellation program 65, the snapshots registered in the deletion candidate list 62 is unmounted and their file-sharing configurations are cancelled according to the unmounting/file-sharing configuration cancellation processing routine RT5 described in relation to FIG. 22.

Accordingly, with the storage system 70 according to Embodiment 4, because only snapshots of the file systems having a small updated-data amount and a small number of accessing users are unmounted, the situation where a large number of snapshots of frequently-accessed and updated file systems stay mounted and remain in the NAS apparatus while snapshots of infrequently-accessed and updated file systems are unmounted and so there are hardly any snapshots of such file systems left in the NAS apparatus can be prevented.

5. Other Embodiments

Incidentally, the foregoing Embodiments 1 to 4 have been explained for cases where this invention is applied in the NAS apparatuses 4, 51, 61, and 71; however, this invention is not limited to such cases, and can be applied in various apparatuses that are configured to be able to obtain a plurality of snapshots on a regular basis, e.g., storage apparatuses.

The foregoing Embodiments 1 to 4 have also been described for cases where the snapshot obtaining unit that obtains a snapshot on a regular basis and manages them; the difference amount detecting unit that detects the difference between two snapshots obtained by the snapshot acquisition unit; the snapshot deleting unit that deletes (i.e., unmounts, and cancels file-sharing configurations for) the previously-obtained snapshot of the two snapshots when the difference amount detected by the difference amount detecting unit is smaller than a predetermined threshold value; the mounting/file-sharing configuration setting unit that mounts snapshots obtained by the snapshot obtaining unit, sets up file-sharing configurations for them, and makes them public, are structured by the same snapshot programs 14, 52, 63, or 72 and the same CPU 10; however this invention is not limited to that case, and these units may be structured as physically different hardware.

Also, the foregoing Embodiments 1, 3 and 4 have been described for cases where whether to unmount a preceding snapshot is decided based on the amount of updated data saved in a differential volume D-VOL in relation to two successive snapshots; however, this invention is not limited that case, and the judgment can be made in relation to two non-successive snapshots.

Furthermore, the foregoing Embodiments 1 to 4 have been described for cases where the amount of updated data saved in the differential volume D-VOL in relation to the two snapshots or the number of updated files is used as a means for detecting the amount of difference between two snapshots, however, this invention is not limited to that case, and various other methods can be applied as the method for detecting the difference between the two snapshots.

The foregoing Embodiment 4 has been explained for the case where, when snapshots of a plurality of file systems are managed with one snapshot management table 17, not only the amount of updated data saved in the differential volume D-VOL but the number of accessing users is also considered as a means for preventing the situation where a large number of snapshots of frequently-accessed and updated file systems are mounted and snapshots of infrequently-accessed and updated file systems are unmounted; however, this invention is not limited to that case, and judgment as to whether or not to mount a snapshot may be performed separately and independently in each file system.

More specifically, for example, when the snapshots of a first file system are SS1-1, SS1-2 . . . and SS1-n respectively, the targets of judgment as to whether or not to mount a snapshot based on the update frequency of the first file system are only the snapshots SS1-1, SS1-2 . . . , accordingly, for example, the snapshots of a second file system, SS2-1, SS2-2 . . . , and SS2-n are not included in the targets. Therefore, for the second file system, judgment as to whether or not to mount each snapshot SS2-1, SS2-2 . . . , or SS2-n is made based on the update frequency of the second file system, independently from the first file system.

The foregoing method can be realized by performing the snapshot mounting/file-sharing configuration setting processing according to the first mounting/file-sharing configuration setting processing routine RT2 described in relation to FIG. 16, for each file system.

By each file system independently judging whether or not to mount a snapshot, the incidence of interference between different file systems (i.e., unmounting of only the snapshots having relatively low update frequency) can be effectively prevented.

What is claimed is:

1. A snapshot management device that obtains and manages a snapshot that is an image of a first volume at a certain point in time, the first volume being used by a user, the snapshot management device comprising:
    a central processing unit including:
    a snapshot obtaining unit that obtains a snapshot on a regular basis and manages the obtained snapshot;
    a difference amount detecting unit that detects the amount of difference between two snapshots obtained by the snapshot obtaining unit; and
    a snapshot deleting unit that deletes, from among the two snapshots, the snapshot obtained earlier than the other, when the difference amount detected by the difference amount detecting unit is smaller than a predetermined threshold value, and deletes, from among a plurality of the obtained snapshots, one of the snapshots that was obtained earliest among the plurality of snapshots if the most recently obtained snapshot cannot be mounted, wherein, before deleting a snapshot that would otherwise be deleted based on the difference amount or whether the most recently obtained snapshot cannot be mounted, the snapshot deleting unit judges whether or not to delete the snapshot based on whether the number of accessing users for the snapshot that would otherwise be deleted is smaller than a predetermined threshold, and wherein, if the snapshot deleting unit judges to delete the snapshot, the deleted snapshot is deleted by canceling mounting and file-sharing configuration executed by the snapshot deleting unit to prevent a user from referring to the deleted snapshot.

2. The snapshot management device according to claim 1, wherein the snapshot obtaining unit saves the difference between the content of the obtained snapshot and that of the first volume in a second volume as differential data, and the difference amount detecting unit detects the amount of updated data saved in the second volume during the time between the acquisition of the preceding snapshot and the acquisition of the following snapshot, as the amount of difference between the two snapshots.

3. The snapshot management device according to claim 1, further comprising a mounting and file-sharing configuration setting unit that mounts the snapshot obtained by the snapshot obtaining unit and sets up a file-sharing configuration for the snapshot so as to make the snapshot public.

4. The snapshot management device according to claim 3, wherein, in asynchronization with the mounting of the snapshot and setting of the snapshots file-sharing configuration performed by the mounting and file-sharing configuration setting unit, the snapshot deleting unit executes snapshot delete processing to delete the relevant snapshot.

5. A snapshot managing method for obtaining and managing a snapshot that is an image of a first volume in a storage apparatus at a certain point in time, the first volume being used by a user, the method comprising:

a first step of obtaining a snapshot on a regular basis and managing the obtained snapshot;

a second step of detecting the amount of difference between two obtained snapshots; and a third step of deleting, from among the two snapshots, the snapshot obtained earlier than the other, when the detected difference amount is smaller than a predetermined threshold value and deleting, from among a plurality of the obtained snapshots, one of the snapshots that was obtained earliest among the plurality of snapshots if the most recently obtained snapshot cannot be mounted, wherein, in the third step, before deleting a snapshot that would otherwise be deleted based on the difference amount or whether the most recently obtained snapshot cannot be mounted, whether or not to delete the snapshot is judged based on whether the number of accessing users for the snapshot that would otherwise be deleted is smaller than a predetermined threshold, and wherein, if it is judged in the third step to delete the snapshot, the deleted snapshot is deleted by canceling mounting and file-sharing configuration executed in the third step to prevent a user from referring to the deleted snapshot.

6. The snapshot managing method according to claim 5, wherein, in the first step, the difference between the content of the obtained snapshot and that of the first volume is saved in a second volume as differential data, and in the second step, the amount of updated data saved in the second volume during the time between the acquisition of the preceding snapshot and the acquisition of the following snapshot is detected as the amount of difference between the two snapshots.

7. The snapshot managing method according to claim 5, wherein, in the first step, the obtained snapshot is mounted and a file-sharing configuration is set for the snapshot so as to be made public.

8. The snapshot managing method according to claim 7, wherein, in the third step, in asynchronization with the mounting of the snapshot and the file-sharing set processing for the snapshot, snapshot delete processing is executed to delete the relevant snapshot.

9. The snapshot management device according to claim 1, wherein, once a snapshot is deleted, the snapshot is referred to by a user if a system administrator manually mounts the snapshot again and sets up a file-sharing configuration for the deleted snapshot.

10. The snapshot managing device according to claim 5, wherein, once a snapshot is deleted, the snapshot is referred to by a user if a system administrator manually mounts the snapshot again and sets up a fife-sharing configuration for the deleted snapshot.

* * * * *